United States Patent [19]

Setoguchi et al.

[11] Patent Number: 5,738,537
[45] Date of Patent: Apr. 14, 1998

[54] EXTERNAL EXTENSION APPARATUS FOR EXTENDING THE FUNCTION OF A PORTABLE ELECTRONIC APPARATUS

[75] Inventors: Mitsuharu Setoguchi; Masami Honda, both of Tokyo, Japan

[73] Assignee: Kabushiki Kaisha Toshiba, Kawasaki, Japan

[21] Appl. No.: 587,404

[22] Filed: Jan. 17, 1996

[30]   Foreign Application Priority Data

Apr. 28, 1995  [JP]  Japan ................................. 7-106240

[51] Int. Cl.⁶ ................................................ H01R 13/62
[52] U.S. Cl. ................... 439/159; 439/489; 439/928.1
[58] Field of Search ......................... 439/928.1, 152–160, 439/488–490

[56]   References Cited

U.S. PATENT DOCUMENTS

| | | | |
|---|---|---|---|
| 4,969,830 | 11/1990 | Daly et al. | 439/347 |
| 5,030,128 | 7/1991 | Herron et al. | 439/372 |
| 5,158,473 | 10/1992 | Takahashi et al. | 439/489 |
| 5,292,267 | 3/1994 | Kobayashi et al. | 439/310 |
| 5,460,547 | 10/1995 | Belt et al. | 439/638 |
| 5,507,661 | 4/1996 | Honda et al. | 439/347 |
| 5,512,833 | 4/1996 | Fukuda et al. | 439/489 |

*Primary Examiner*—Gary F. Paumen
*Attorney, Agent, or Firm*—Limbach & Limbach, LLP

[57]   ABSTRACT

An expanding apparatus includes a housing with a bearing surface on which a rear portion of a computer is to be placed, and engaging projections arranged on the bearing surface so as to be fitted individually in engagement holes of the computer. As an operating lever provided on the housing is swung up or down, the engaging projections is moved between a first position in which the computer is connected to a first expansion connector of the apparatus and a second position in which the connection is removed. The apparatus is provided with a photointerrupter and an actuating piece which are arranged in the housing, while the operating lever has a push projection which causes the actuating piece to switch the photointerrupter on and off as the lever is swung. When the operating lever is swung from a home position toward a release position with the computer connected to the external expanding apparatus, the photointerrupter detects this and delivers a warning signal to the computer.

10 Claims, 18 Drawing Sheets

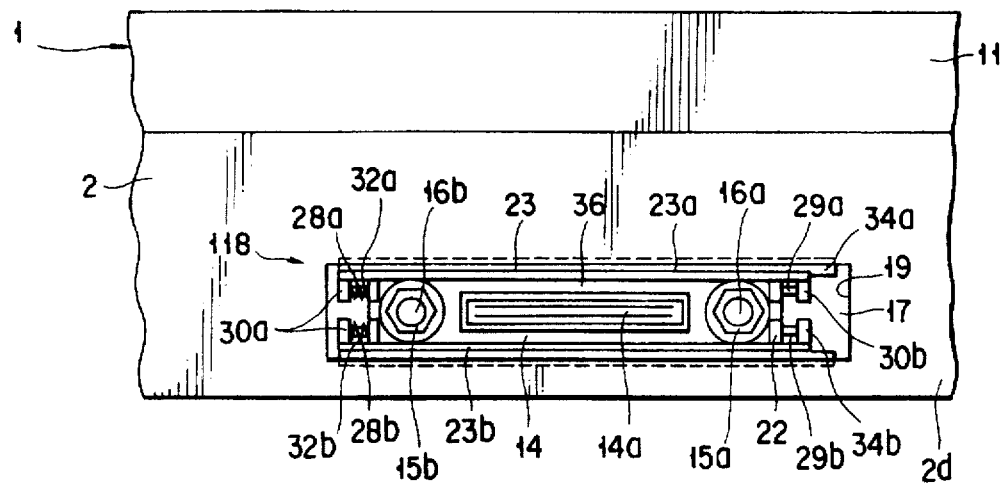
FIG. 3
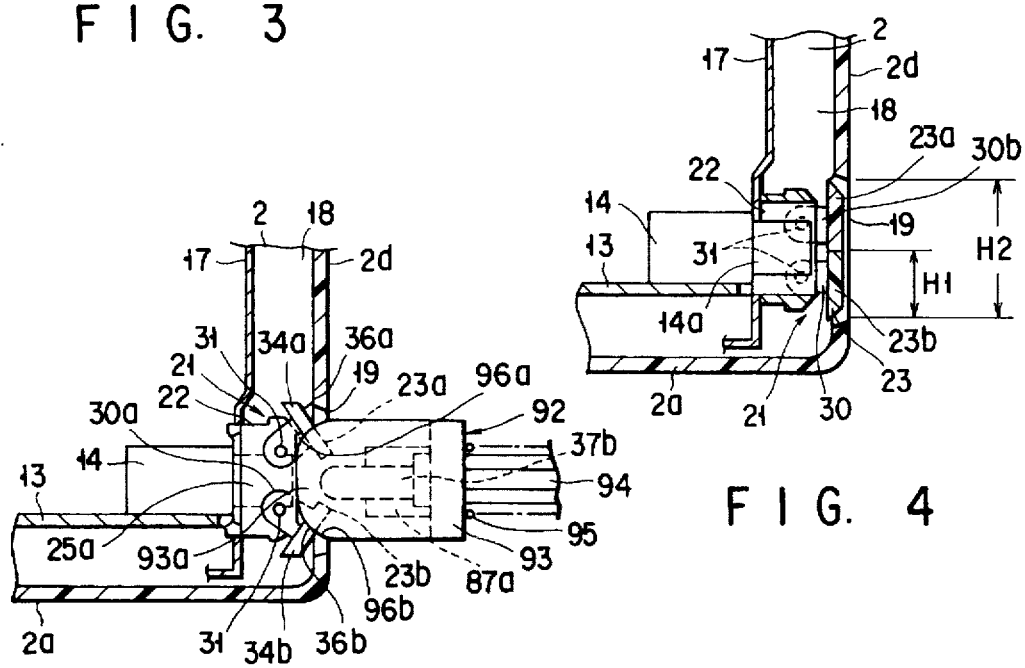
FIG. 5
FIG. 4
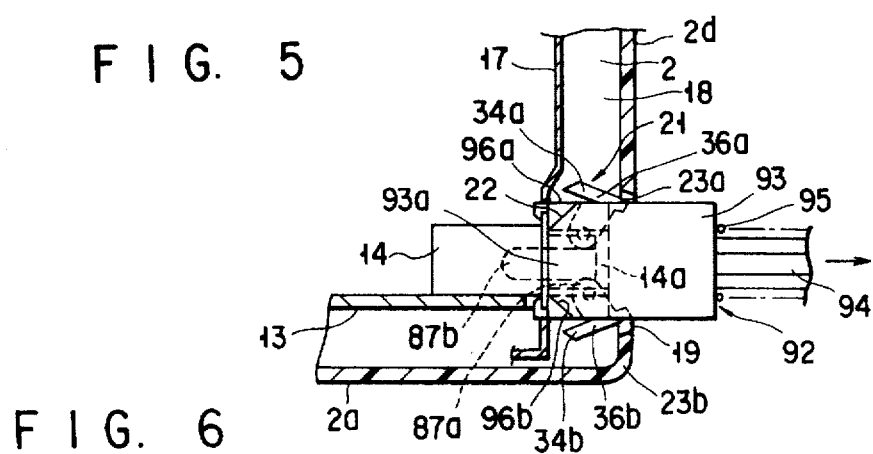
FIG. 6

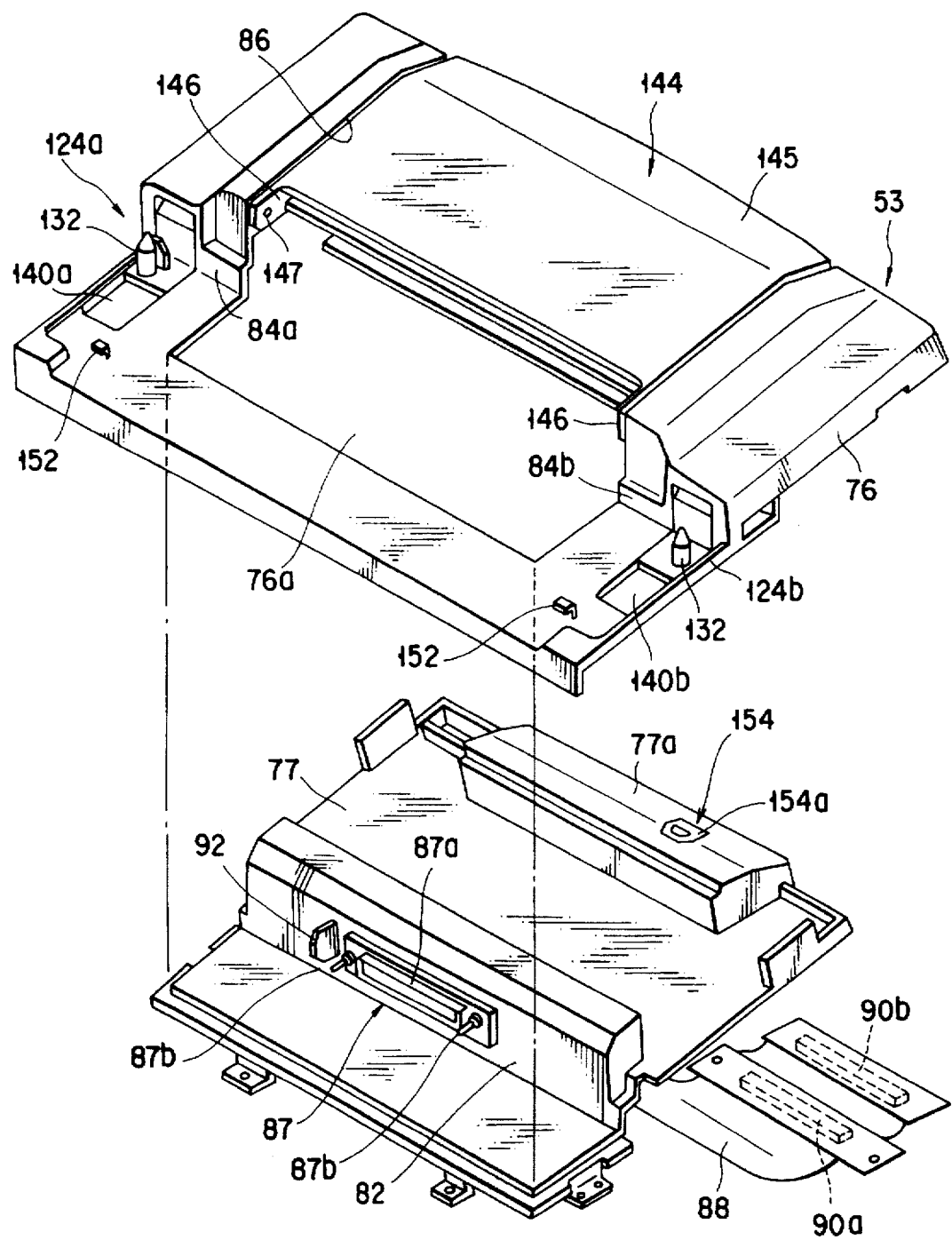
F I G. 11

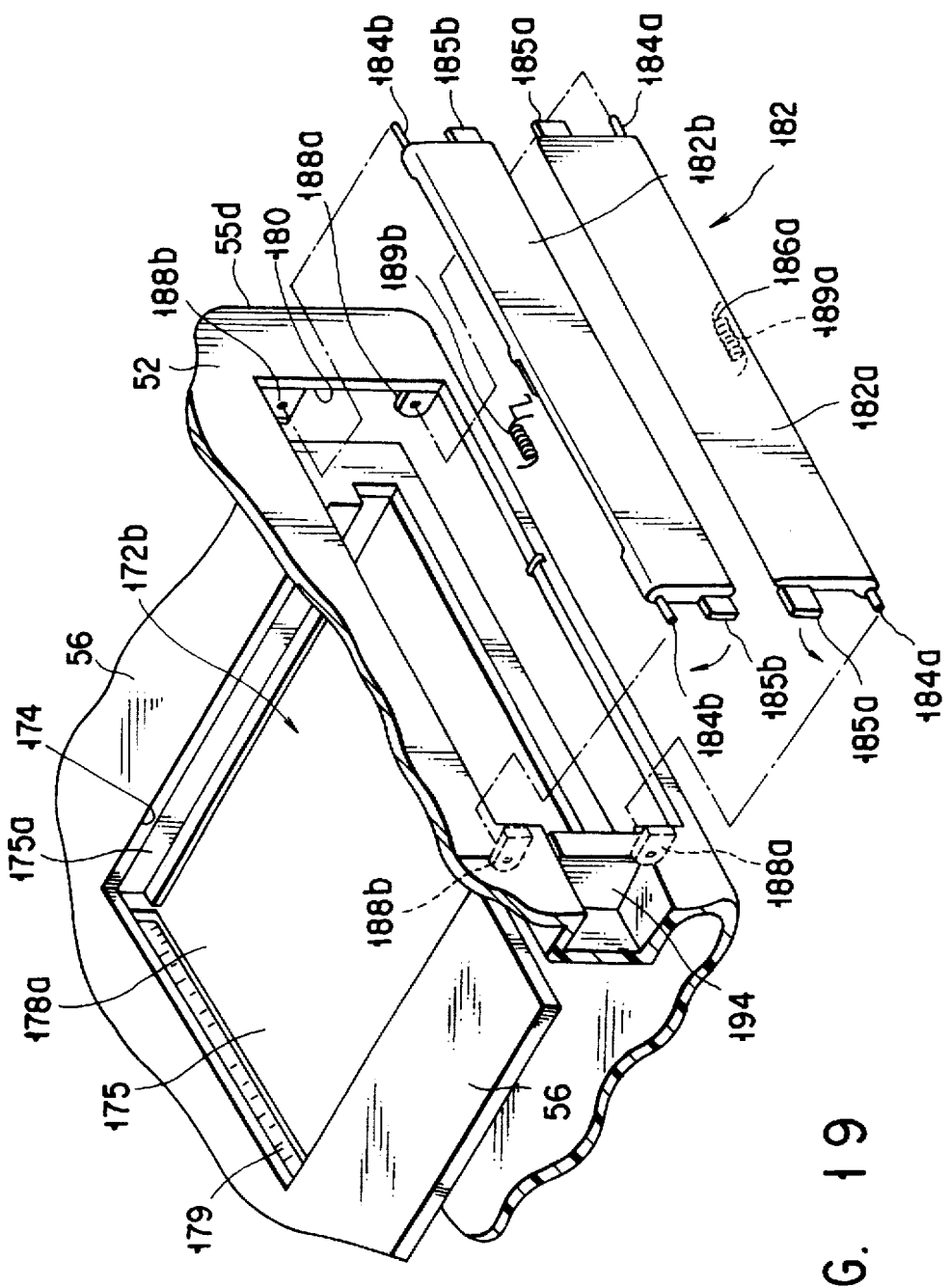
F I G. 19

EXTERNAL EXTENSION APPARATUS FOR EXTENDING THE FUNCTION OF A PORTABLE ELECTRONIC APPARATUS

BACKGROUND OF THE INVENTION

1. Field of the Invention

The present invention relates to an external expanding apparatus for expanding the function of a portable electronic device, such as a book- or notebook-type portable computer.

2. Description of the Related Art

Book- or notebook-type portable computers, which use a built-in battery pack as their power source, have an advantage in being handy to carry about and freely used even in those places which are not accessible to the commercial power supply.

The computers of this type have a compact design for higher portability, so that their standard functions are inevitably more limited than those of desktop computers. Accordingly, one such portable computer is provided with a plurality of connectors and ports for function expansion on the rear face of its casing which supports a keyboard and a display unit. The computer is additionally furnished with new functions by connecting peripheral devices, such as a hard disk drive, mouse, printer, etc., to the connectors and ports.

In transporting the computer with the peripheral devices connected to the connectors and ports, however, the peripheral devices must be removed from their corresponding connectors or ports. In restoring the computer to its original state after using it in some other place, the peripheral devices must be connected again. In the case where a large number of peripheral devices are connected, therefore, the removal and connection require very troublesome operations.

To cope with this, there have recently been provided external expanding apparatuses which are adapted to be interposed between a portable computer and a plurality of peripheral devices and relay signals transferred between the computer and the devices.

One such external expanding apparatus comprises a plurality of connectors and ports connectable with the peripheral devices, power supply connector, etc. and an expansion connector connected electrically to these elements. The external expanding apparatus also comprises a mounting portion on which the computer is removably mounted. The mounting portion includes a bearing surface on which the rear portion of the casing of the computer is placed and a connector setting surface which is opposed to the rear face of the casing. The expansion connector is mounted on the connector setting surface. Further, the external expanding apparatus comprises engaging portions, which are provided on the bearing surface and movable toward and away from the connector setting surface, and a swingable operating lever for moving the engaging portions.

The computer which is connected to the external expanding apparatus, on the other hand, has an expansion connector for function expansion on its rear face. Recesses which are adapted to engage the engaging portions of the external expanding apparatus are formed in the bottom face of the casing of the computer in the vicinity of the rear face of the casing.

In connecting the computer to the external expanding apparatus, the rear portion of the computer is placed on the bearing surface of the expanding apparatus in a manner such that the engaging portions are fitted individually in the recesses, and the operating lever is then swung down to move the engaging portions toward the connector setting surface, whereupon the computer is drawn toward the setting surface. As a result, the expansion connector of the computer is connected to the expansion connector of the expanding apparatus. In removing the computer from the external expanding apparatus, on the other hand, the operating lever is swung up to move the computer away from the connector setting surface, whereby the two expansion connectors are disconnected from each other.

In case the operating lever is swung up by mistake during operation of the computer which is connected to the conventional external expanding apparatus arranged in the aforementioned manner, however, the computer will be unexpectedly disengaged from the expanding apparatus, and therefore, disconnected from the hard disk drive and other peripheral devices. Inevitably, therefore, data in process will be erased.

There are two types of portable computers, DC-driven and AC-driven. Preferably, therefore, they should be combined individually with DC- and AC-driven external expanding apparatuses.

Moreover, there are a plurality of kinds of portable computers, and the mounting positions of the expansion connectors vary depending on their specifications. If a computer is mounted on the bearing surface of a nonconforming external expanding apparatus to be connected thereto, the respective expansion connectors of the computer and the expanding apparatus interfere with each other, so that the connectors, computer, or expanding apparatus may possibly be damaged.

In the external expanding apparatus described above, the connectors or ports are attached to a circuit board which is located in the casing of the apparatus, and the expansion connector is connected to the circuit board through a flexible wiring board. In this case, the flexible wiring board and the circuit board are connected to each other by connecting a junction connector, which is mounted on an extending end of the wiring board, to another junction connector on the circuit board.

In the case where the external expanding apparatus is provided with a large number connectors and ports, terminals of the expansion connector and wires on the flexible wiring board connected thereto are also large in number. Accordingly, a plurality of junction connectors must be attached to the wiring board and connected individually to other junction connectors on the circuit board.

In this case, however, the intervals between the junction connectors on the flexible wiring board must be accurately aligned with the intervals between the ones on the circuit board. In case these intervals are not in alignment due to assembly errors or the like, it is hard to connect the junction connectors while the external expanding apparatus is being assembled.

SUMMARY OF THE INVENTION

The present invention has been contrived in consideration of these circumstances, and an object the invention is to provide an external expanding apparatus capable of preventing an electronic device connected thereto from being unexpectedly disengaged, thus ensuring safety.

Another object of the invention is to provide an external expanding apparatus capable of expanding the function of an AC-driven electronic device.

Still another object of the invention is to provide an external expanding apparatus capable of preventing wrong connection between electronic devices of different types.

An additional object of the invention is to provide an external expanding apparatus which enjoys high assembly performance.

In order to achieve the above object, an external expanding apparatus according to an aspect of the present invention comprises: an apparatus body having a bearing surface on which a device body of a portable electronic device is to be placed, and a connector setting surface for opposing to a first connector of the device body placed on the bearing surface; a second connector mounted on the connector setting surface and connectable with the first connector; an engaging portion provided on the bearing surface so as to be movable between a first position in which the engaging portion adjoins the connector setting surface and a second position in which the engaging portion is separated from the connector setting surface, and adapted to engage the device body on the bearing surface; operating means connected to the engaging portion and including an operating member which is provided on the apparatus body to be movable between a home position, a release position, and a connection completion position between the home and release positions, for moving the engaging portion from the second position to the first position, thereby causing the first connector of the device body in engagement with the engaging portion to be connected to the second connector, as the operating member is moved from the release position to the connection completion position, and for moving the engaging portion from the first position to the second position, thereby causing the first and second connectors to be disconnected from each other, as the operating member is moved from the connection completion position to the release position; sensing means for detecting the movement of the operating member between the home position and the release position; and output means for delivering a warning signal to the portable electronic device through the first and second connectors when the movement of the operating member from the home position to the connection completion position is detected by the sensing means with the first connector connected to the second connector.

In connecting the portable electronic device to the external expanding apparatus constructed in this manner, the device body of the electronic device is first placed on the bearing surface of the apparatus body in a manner such that it is in engagement with the engaging portion. When the operating member is then moved from the release position to the connection completion position, the engaging portion is moved from the first position to the second position, whereupon the device body is moved toward the connector setting surface of the apparatus body. As a result, the first connector of the device body is connected to the second connector of the apparatus body, whereupon the electronic device is connected to the external expanding apparatus. After the connection is finished, the operating member is moved to and held in the home position.

When the operating member is moved from the home position toward the release position with the portable electronic device connected to the external expanding apparatus, on the other hand, this movement is detected by the sensing means, and the output means delivers the warning signal to the electronic device through the first and second connectors.

In this case, the portable electronic device actuates a warning buzzer or lamp in response to the warning signal, thereby warning an operator of disconnection of the electronic device from the external expanding apparatus.

The sensing means includes a sensed portion provided at the operating member, and a sensor portion provided at the apparatus body, for detecting the sensed portion when the operating lever is moved to the home position.

An external expanding apparatus according to another aspect of the invention is used in combination with a portable electronic device having a device body provided with a first connector and a first AC power supply socket, and comprises: an apparatus body having a bearing surface on which the device body is to be placed, and a connector setting surface for opposing to the first connector and the first AC power supply socket of the device body placed on the bearing surface; a second connector and an AC power supply connector mounted on the connector setting surface and connectable with the first connector and the first AC power supply socket, respectively, of the device body on the bearing surface; a plurality of branch connectors provided on the apparatus body, connected electrically to the second connector, and connectable individually with other electronic devices; and a second AC power supply socket attached to the apparatus body, connected electrically to the AC power supply connector, and connectable with an AC feeder connector.

When the first connector of the portable electronic device is connected to the second connector of the apparatus body, according to the external expanding apparatus constructed in this manner, the AC power supply socket of the electronic device is connected to the AC power supply connector of the apparatus body at the same time. By connecting the AC feeder connector to the AC power supply socket of the apparatus body in this state, the AC power supply can be connected to the electronic device means of the AC power supply socket to actuate the device.

An external expanding apparatus, according to still another aspect of the invention is used in combination with a specific portable electronic device having a device body provided with an engaged portion in a predetermined shape and a first connector, and comprises: an apparatus body having a bearing surface on which the device body is placed and a connector setting surface opposed to the first connector of the device body; a second connector mounted on the connector setting surface and connectable with the first connector; an engaging portion attached to the bearing surface so as to be movable between a first position in which the engaging portion adjoins the connector setting surface and a second position in which the engaging portion is separated from the connector setting surface, having a shape corresponding to the shape of the engaged portion, and adapted to engage only the engaged portion of the device body on the bearing surface; and operating means connected to the engaging portion and serving to move the engaging portion between the first and second positions, the operating means including an operating member attached to the apparatus body so as to be movable between a release position and a connection completion position, and designed so that the engaging portion is moved from the second position to the first position, thereby causing the first connector of the device body in engagement with the engaging portion to be connected to the second connector, as the operating member is moved from the release position to the connection completion position, and that the engaging portion is moved from the first position to the second position, thereby causing the first and second connectors to be disconnected from each other, as the operating member is moved from the connection completion position to the release position.

In connecting the portable electronic device to the external expanding apparatus constructed in this manner, the device body is placed on the bearing surface of the apparatus body in a manner such that the engaging portion of the apparatus body is in engagement with the engaged portion formed on the device body of the electronic device. In this case, the engaging portion is shaped corresponding to the engaged portion of the specific electronic device so that it can engage this engaged portion only. Thus, any other non-conforming portable electronic devices can be prevented from being attached to the apparatus body.

When the operating member is then moved from the release position to the home position, the engaging portion is moved from the first position to the second position, whereby the device body is moved toward the connector setting surface of the apparatus body. As a result, the first connector of the device body is connected to the second connector of the apparatus body, whereupon the portable electronic device is connected to the external expanding apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is an enlarged front view showing a first expansion connector portion provided on the rear face of the portable computer;

FIG. 4 is a sectional view of the first expansion connector portion;

FIG. 5 is a sectional view as in FIG. 4 showing the way the distal end portion of a cover operating member is inserted in a cover unit of the first expansion connector;

FIG. 6 is a sectional view as in FIG. 4 showing the cover unit open;

FIGS. 7 to 21 show an external expanding apparatus according to a first embodiment off the invention, in which:

FIG. 7 is a perspective view of the apparatus,

FIG. 8 is a perspective view showing the rear side of the apparatus connected with a portable computer, FIG. 9 is a perspective view showing the rear side of the apparatus with its operating lever in a release position, FIG. 10 is an exploded perspective view of the apparatus, FIG. 11 is an exploded perspective view of an upper housing of the apparatus, FIG. 12 is an enlarged exploded perspective view showing a second expansion connector portion of the apparatus, FIG. 13 is a perspective view showing a loading-unloading function of the apparatus, FIG. 14 is a sectional view of the apparatus with the operating lever in the release position, FIG. 15 is a sectional view of the apparatus with the operating lever in a home position, FIG. 16 is a block diagram schematically showing the respective arrangements of the external expanding apparatus and the portable computer, FIG. 17 is an enlarged perspective view showing a card holder unit of the apparatus, FIG. 18 is a sectional view of the card holder unit, FIG. 19 is an exploded perspective view showing a cover for opening and closing an inlet slot of the card holder unit, FIG. 20 is a perspective view of the card holder unit with a card of Type 1 therein, and FIG. 21 is a perspective view of the card holder unit with a card of Type 3 therein;

FIGS. 22 to 24 show an external expanding apparatus according to a second embodiment of the invention, in which:

FIG. 22 is a perspective view of the apparatus,

FIG. 23 is a perspective view showing the rear side of the apparatus, and

FIG. 24 is a cutaway side view of the external expanding apparatus; and

DETAILED DESCRIPTION OF THE PREFERRED EMBODIMENTS

Preferred embodiments of the present invention will now be described in detail with reference to the accompanying drawings.

Figure 1:
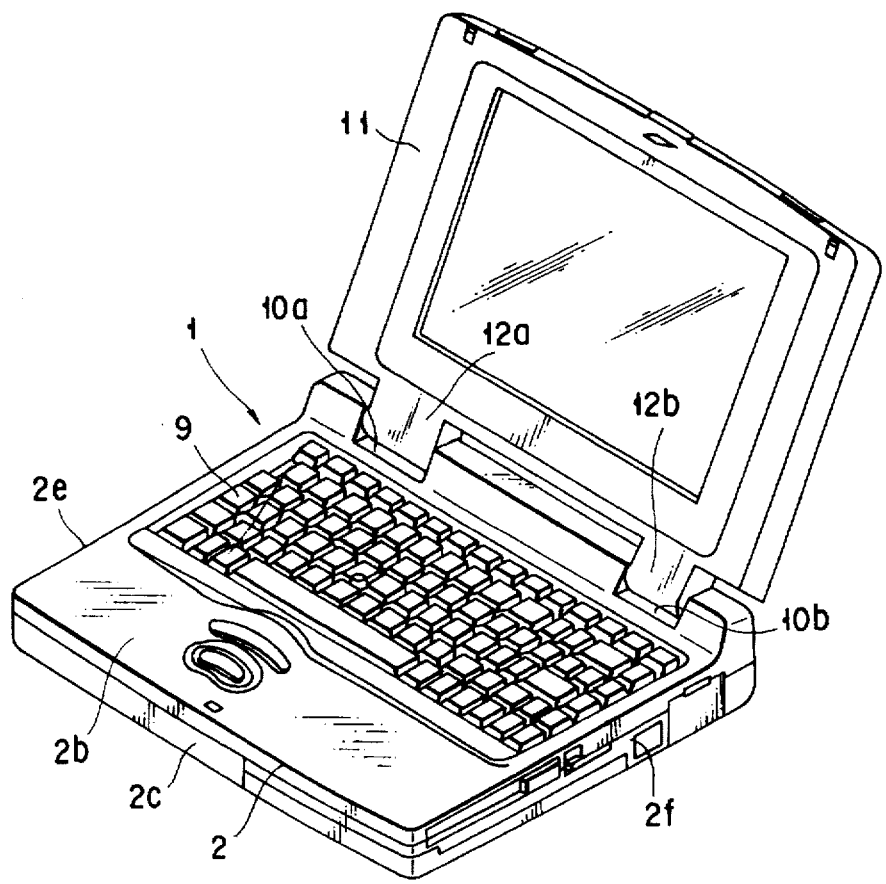
FIG. 1 is a perspective view showing an example of a portable computer connected to an external expanding apparatus according to the present invention.
Figure 2:
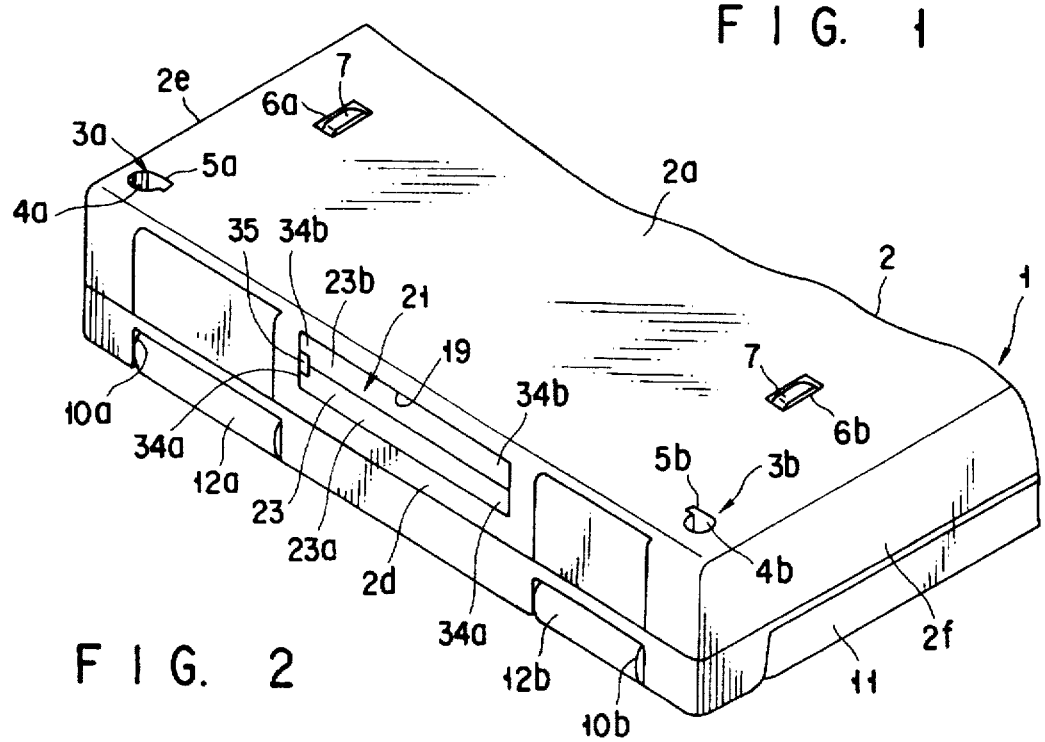
FIG. 2 is a perspective view showing the rear bottom side of the portable computer.

FIGS. 1 and 2 show a book-type portable computer 1 for use as a portable electronic device which is connected to an external expanding apparatus according to the invention. The computer 1 comprises a plastic casing 2 serving as an apparatus body. The casing 2 is in the form of a flat rectangular box having a bottom face 2a and a top face 2b, which extend parallel to each other, and a front face 2c, a rear face 2d, and left- and right-hand side faces 2e and 2f, which are continuous with the bottom and top faces 2a and 2b.

The bottom face 2a is formed having fitting holes 3a and 3b which serve as engaged portions and are situated adjacent to the rear face 2d and the side faces 2e and 2f of the casing 2. The fitting hole 3a includes a cylindrical portion 4a and a groove portion 5a extending from the portion 4a toward the opposite side face 2f. Likewise, the fitting hole 3b includes a cylindrical portion 4b and a groove portion 5b extending from the portion 4b toward the opposite side face 2e.

A pair of terminal exposing apertures 6a and 6b, left and right, opens in the bottom face 2a. The apertures 6a and 6b are situated nearer to the front side of the casing 2 than the fitting holes 3a and 3b. A metallic terminal plate 7 is located in the open end of each of the apertures 6a and 6b. Thus, the terminal plates 7 are exposed on the bottom face 2a through the terminal exposing apertures 6a and 6b, individually.

Arranged on the top face 2b of the casing 2, as shown in FIG. 1, is a keyboard 9 which is used to input information and commands. A pair of display supporting portions 10a and 10b, left and right, are formed at the rear end portion of the top face 2b. A flat display unit 11 is connected to the display supporting portions 10a and 10b. The display unit 11 has a pair of legs 12a and 12b, left and right, which are pivotally mounted on the supporting portions 10a and 10b, respectively, by means of hinge devices (not shown).

Thus, the display unit 11 is supported on the casing 2 to be rotatable between a closed position, in which it laps the top face 2b of the casing 2, thereby covering the keyboard 9, and an open position in which the unit 11 stands upright at the back of the keyboard 9.

As shown in FIG. 4, a printed circuit board 13 is housed in the casing 2. The board 13 extends substantially parallel to the bottom face 2a of the casing 2, and its rear end portion adjoins the rear face 2d of the casing 2. The printed circuit board 13 has a wiring pattern (not shown) for grounding, which is connected electrically with the terminal plates 7.

Provided at the rear end portion of the circuit board 13, as shown in FIGS. 3 and 4, is a first expansion connector 14 which serves as a first connector used to extend the function of the computer 1. The first expansion connector 14 includes a connector body 14a in the form of an elongated box extending in the width direction of the casing 2, and a pair of nuts 15a and 15b arranged individually on the opposite sides of the connector body 14a. The nuts 15a and 15b are formed having positioning holes 16a and 16b, respectively. The first expansion connector 14 adjoins the rear face 2d of the casing 2, and is situated in the center with respect to the width direction of the rear face 2d.

A metallic connector panel 17 for supporting the first expansion connector 14 is mounted on the rear end portion of the printed circuit board 13. The connector panel 17 is located opposite to the inside of the rear face 2d of the casing 2, and covers the junction between the printed circuit board 13 and the first expansion connector 14 from behind. A storage space 18 with a predetermined capacity is defined between the connector panel 17 and the rear face 2d.

In the central portion of the rear face 2d of the casing 2, with respect to the width direction thereof, as shown in FIGS. 2 to 4, opens an elongated connector exposing slot 19 which extends in the width direction of the casing 2. The slot 19 faces the first expansion connector 14. The casing 2 is fitted with a cover unit 21 for opening and closing the connector exposing slot 19. The cover unit 21 includes a frame 22 and a connector cover 23 supported thereon.

The frame 22 is in the form of an elongated rectangle extending in the width direction of the casing 2, and is fixed to the connector panel 17. The frame 22 is situated in the storage space 18 between the connector panel 17 and the rear face 2d of the casing 2, and the first expansion connector 14 projects inside the frame 22. Two pairs of shafts 28a, 28b and 29a, 29b protrude individually from the side faces of the frame 22 so as to be arranged above and below. The shafts 28a and 28b are coaxial with the shafts 29a and 29b, respectively.

The connector cover 23 is vertically divided in two, first and second covers 23a and 23b. The covers 23a and 23b extend individually in the width direction of the casing 2. Also, the first and second covers 23a and 23b are arranged above and below inside the connector exposing slot 19. The height (H1) of each of the covers 23a and 23b is adjusted to about half that (H2) of the opening of the slot 19.

The first and second covers 23a and 23b are provided with support pieces 30a and 30b, respectively, on the opposite end portions thereof. The support pieces 30a and 30b extend at right angles to the covers 23a and 23b, and each piece has a through hole 31 in its distal end portion. The shafts 28a, 28b, 29a and 29b are fitted individually in the through holes 31 for rotation, whereby the first and second covers 23a and 23b are supported on the frame 22.

Thus, the first and second covers 23a and 23b are supported on the frame 22 so as to be swingable around their corresponding shafts 28a, 28b, 29a and 29b between a closed position shown in FIG. 4 and an open position in which they are situated above and below the frame 22, as shown in FIG. 6. In the closed position, the first and second covers 23a and 23b are situated flush with each other, and also, continuous and flush with the rear face 2d of the casing 2, thereby closing the connector exposing slot 19. In the open position, on the other hand, the covers 23a and 23b penetrate the storage space 18 in a substantially horizontal posture, and retract from the inside of the slot 19. In this state, the slot 19 is opened so that the first expansion connector 14 is exposed on the rear face 2d of the casing 2, as shown in FIG. 3.

The first and second covers 23a and 23b are urged to swing toward the closed position by means of torsion coil springs 32a and 32b as return springs which are wound on the shafts 28a and 28b, respectively. Normally, therefore, the covers 23a and 23b are situated in the closed position where they abut against each other, thereby concealing the first expansion connector 14 from the outside.

As shown in FIGS. 2 and 3, open-close guide portions 34a and 34b are formed on one end portions of the first and second covers 23a and 23b, respectively. The guide portions 34a and 34b are continuous and flush with the covers 23a and 23b, respectively, each constituting part of its corresponding cover. The guide portions 34a and 34b face each other in a manner such that an inlet aperture 34 is defined between them.

The inlet aperture 35 is situated on one side of the first expansion connector 14, and is opposed to the connector panel 17 inside the connector exposing slot 19. As shown in FIGS. 5 and 6, the open-close guide portions 34a and 34b have their respective edges which constitute the upper and lower edges, respectively, of the opening of the inlet aperture 35. These edges form arcuate guide faces 36a and 36b.

An external expanding apparatus 50 according to a first embodiment of the present invention is interposed between the computer 1 and a plurality of peripheral devices, and serves as a junction apparatus for relaying signals transferred between the computer 1 and the peripheral devices.

As shown in FIGS. 7 to 10, the external expanding apparatus 50 comprises a plastic housing 51 for use as an apparatus body. The housing 51 is divided in two, a lower housing 52 and an upper housing 53 put on the lower housing 52.

The lower housing 52 is in the form of a rectangular box having a flat bottom face 55a, a rear face 55d continuous with the bottom face 55a, and left-and right-hand side faces 55c and 55d. Mounted on the bottom face 55a is a main circuit board 56 for use as a circuit board according to the present invention. The main circuit board 56 is located in the rear half of the lower housing 52, and its rear edge and left- and right-hand side edges adjoin the rear face 55b and the side faces 55c and 55d of the housing 52, respectively.

Arranged side by side at the rear end portion of the main circuit board 56 are a pair of external connectors 58 and 59 for connecting a mouse or external keyboard, a connecting port 60 for connecting a peripheral device which has an interface connector based on the RS232C standards, and a first parallel port 61 for connecting a printer or floppy disk drive (FDD). Also arranged are an interface connector 62 for connecting a peripheral device, such as an optical disk drive or HDD, which requires high-speed data transfer, a second parallel port 63 for connecting a peripheral device such as a CD-ROM device, and a DC power supply terminal 64.

The ports 60, 61 and 63, connectors 58, 59 and 62, and DC power supply terminal 64, which are situated at the rear end of the circuit board 56, adjoin the rear face 55b of the lower housing 52. A plurality of outlet apertures 65 open in the rear face 55b, and the ports 60, 61 and 63, connectors 58, 59 and 62, and DC power supply terminal 64 are exposed at the back of the housing 51 through the apertures 65.

Arranged in the center of the circuit board 56, moreover, are a first stacking connector 67 and a pair of first junction connectors 66a and 66b which are formed of a stacking connector each. The first stacking connector 67 is connected to a wiring pattern (not shown) which is printed on the circuit board 56. The first junction connectors 66a and 66b are connected electrically to the ports 60, 61 and 63, connectors 58, 59 and 62, and DC power supply terminal 64 through the wiring pattern on the circuit board 56.

Figure 12:
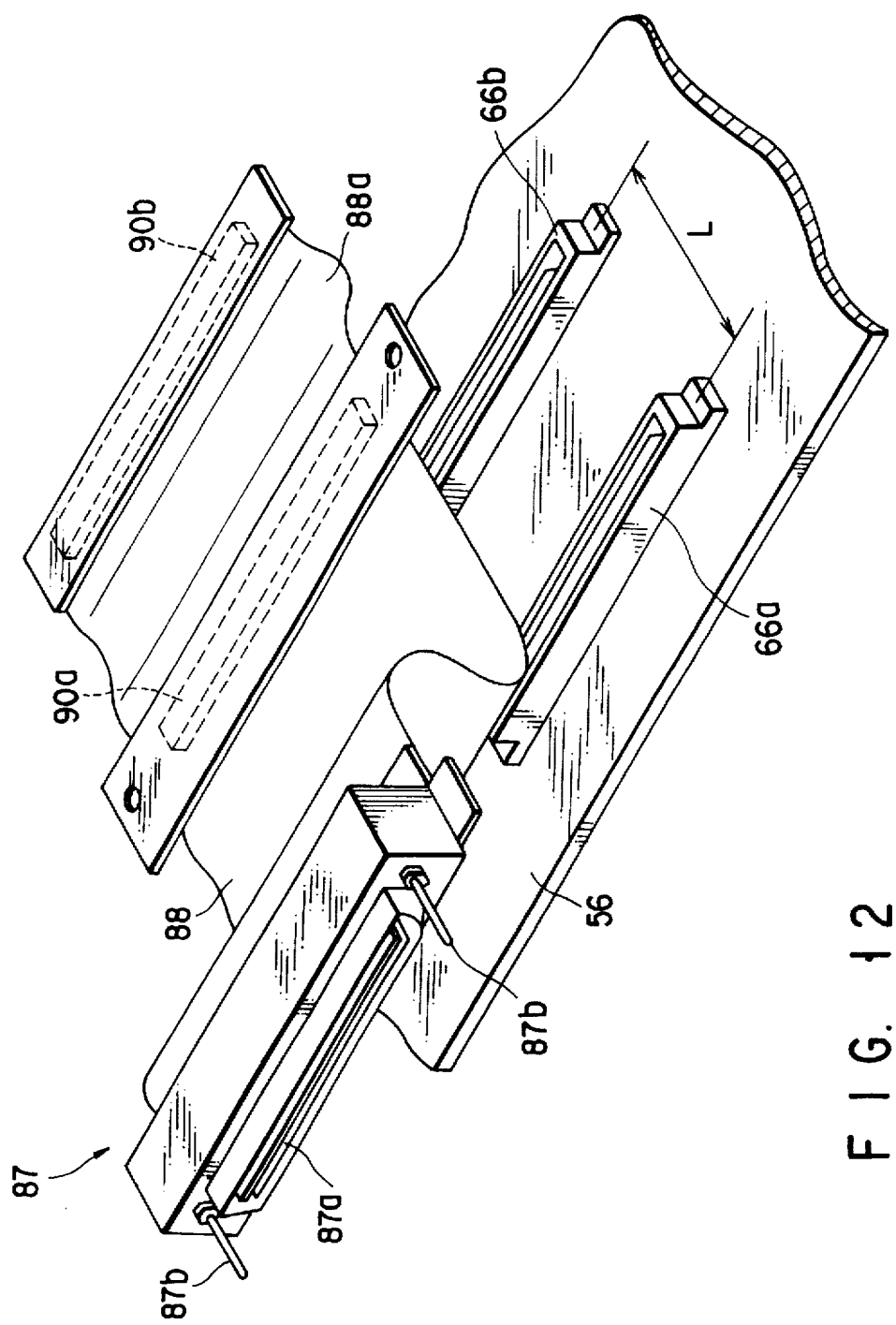

As shown in FIG. 12, the first junction connectors 66a and 66b extend parallel to each other in the width direction of the housing 51, and are spaced at a predetermined distance L in the depth direction of the housing 51.

Figure 10:
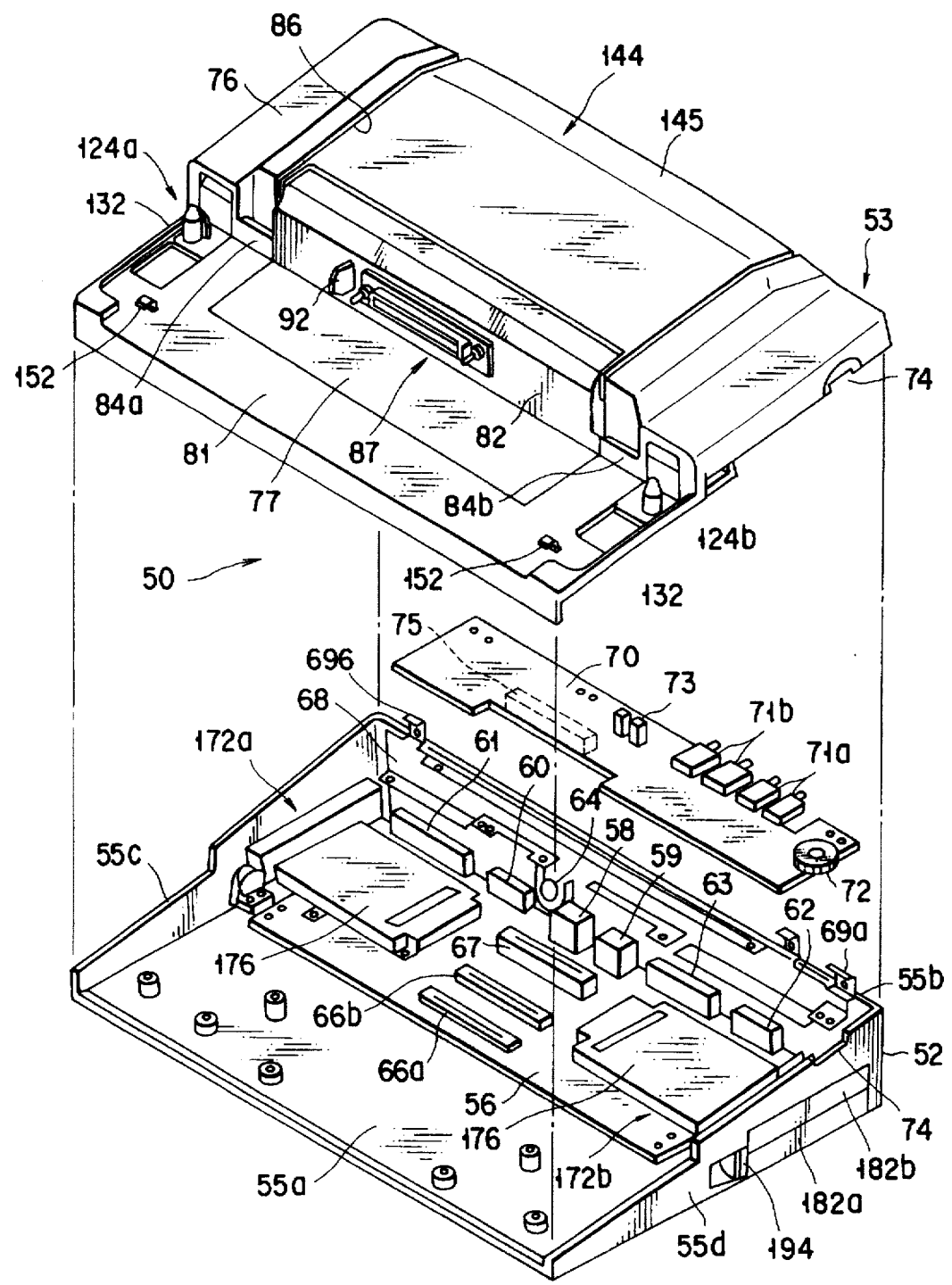
Figure 14:
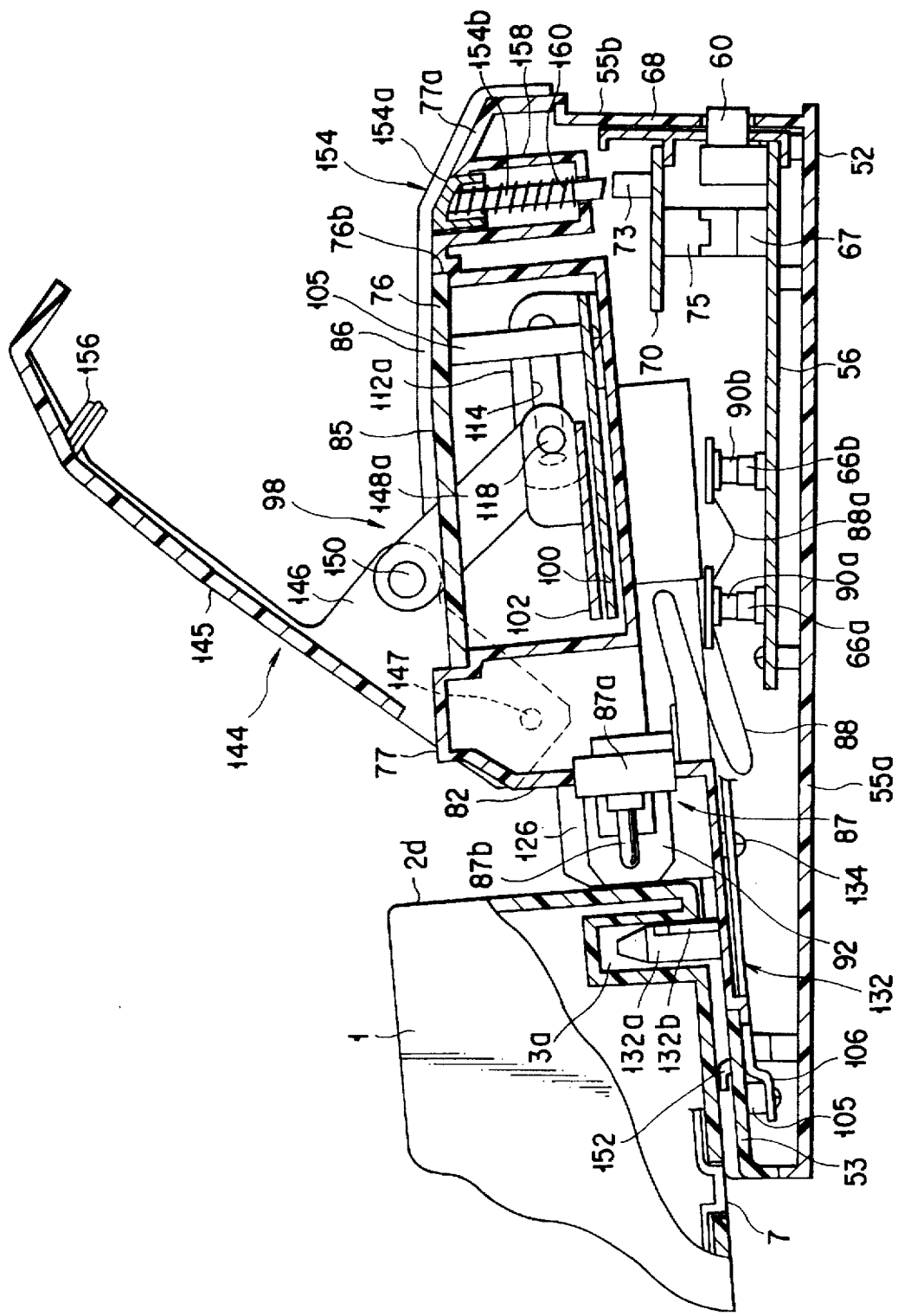

As shown in FIGS. 10 and 14, a metallic connector panel 68 is provided at the rear end portion of the circuit board 56. The connector panel 68 extends in the width direction of the lower housing 52, and is screwed together with the circuit board 56 to the bottom face 55a of the lower housing 52. The connector panel 68 stands upright on the circuit board 56, and covers the junctions between the board 56 and the ports 60, 61 and 63, connectors 58, 59 and 62, and DC power supply terminal 64 from behind. A pair of upwardly extending support pieces 69a and 69b are formed integrally on the opposite end portions of the connector panel 68.

As shown in FIGS. 10 and 14, moreover, a sub-circuit board 70 is located above the rear end portion of the main circuit board 56 so as to extend parallel thereto. The rear end portion of the board 70 is supported on the connector panel 68. A pair of voice input terminals 71a and a pair of voice output terminals 71b are arranged side by side on the sub-circuit board 70. Also arranged on the board 70 are a volume dial 72, a photointerrupter 73 which constitutes a sensor unit of sensing means (mentioned later), etc.

Figure 7:
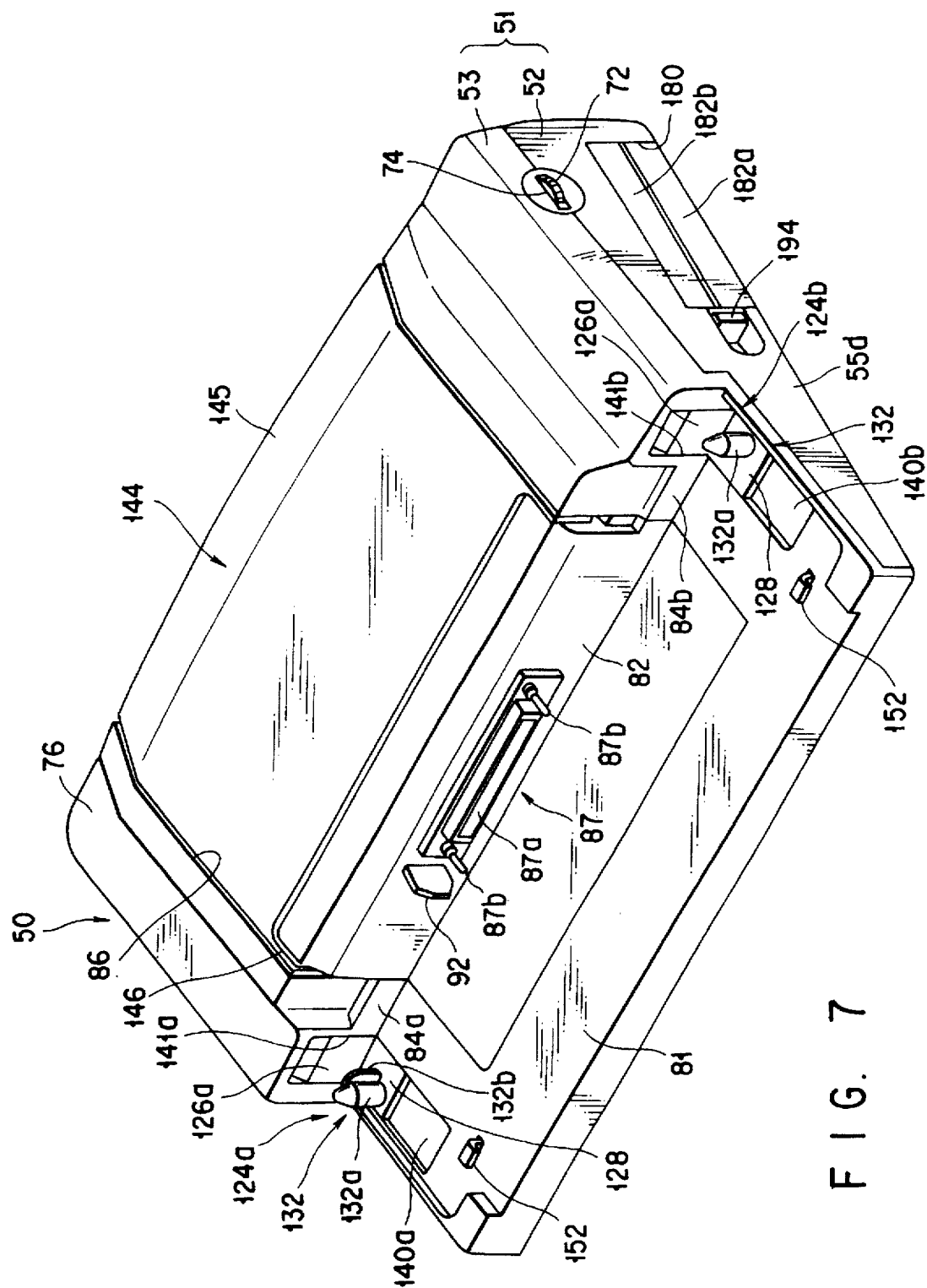
Figure 8:
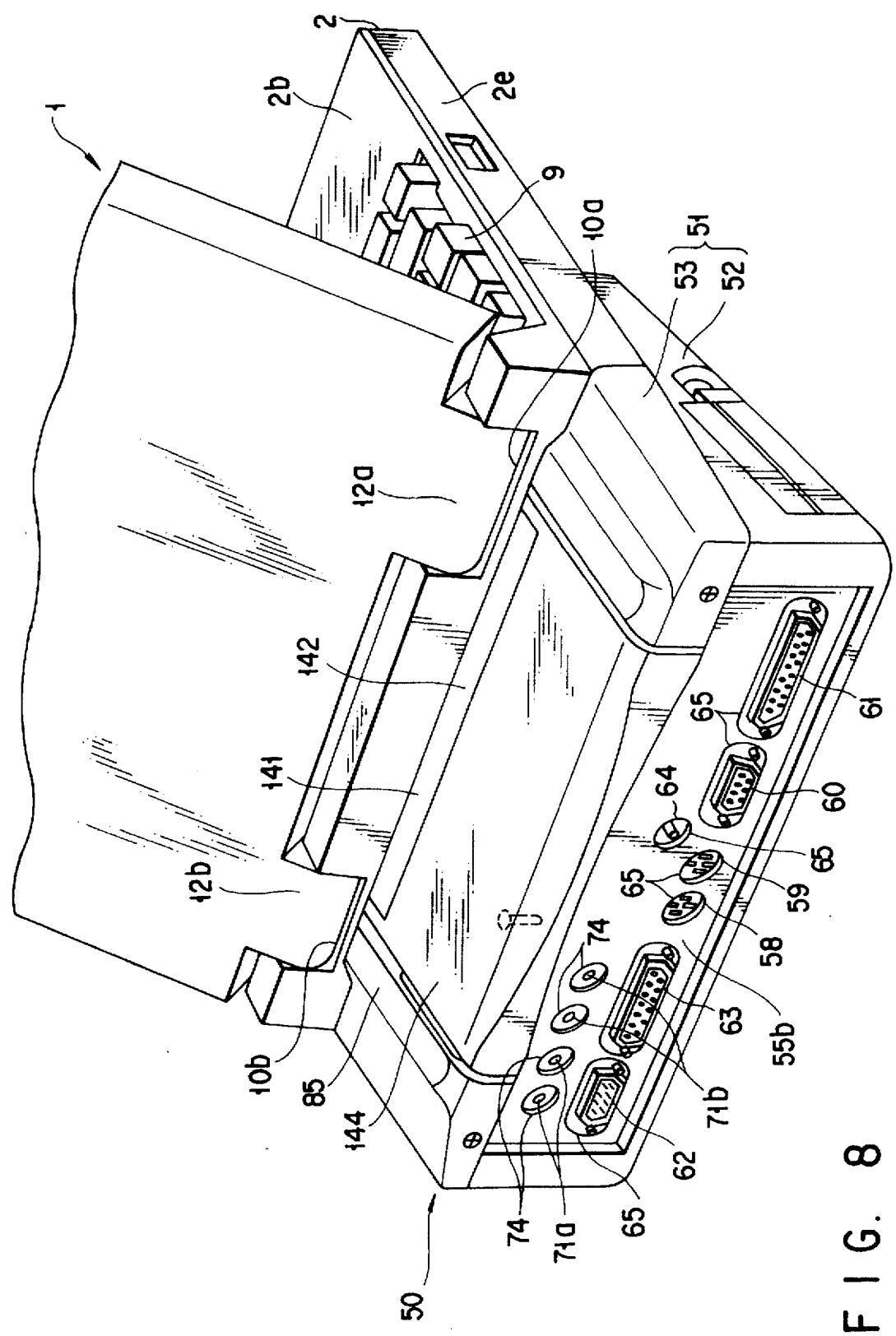
Figure 9:
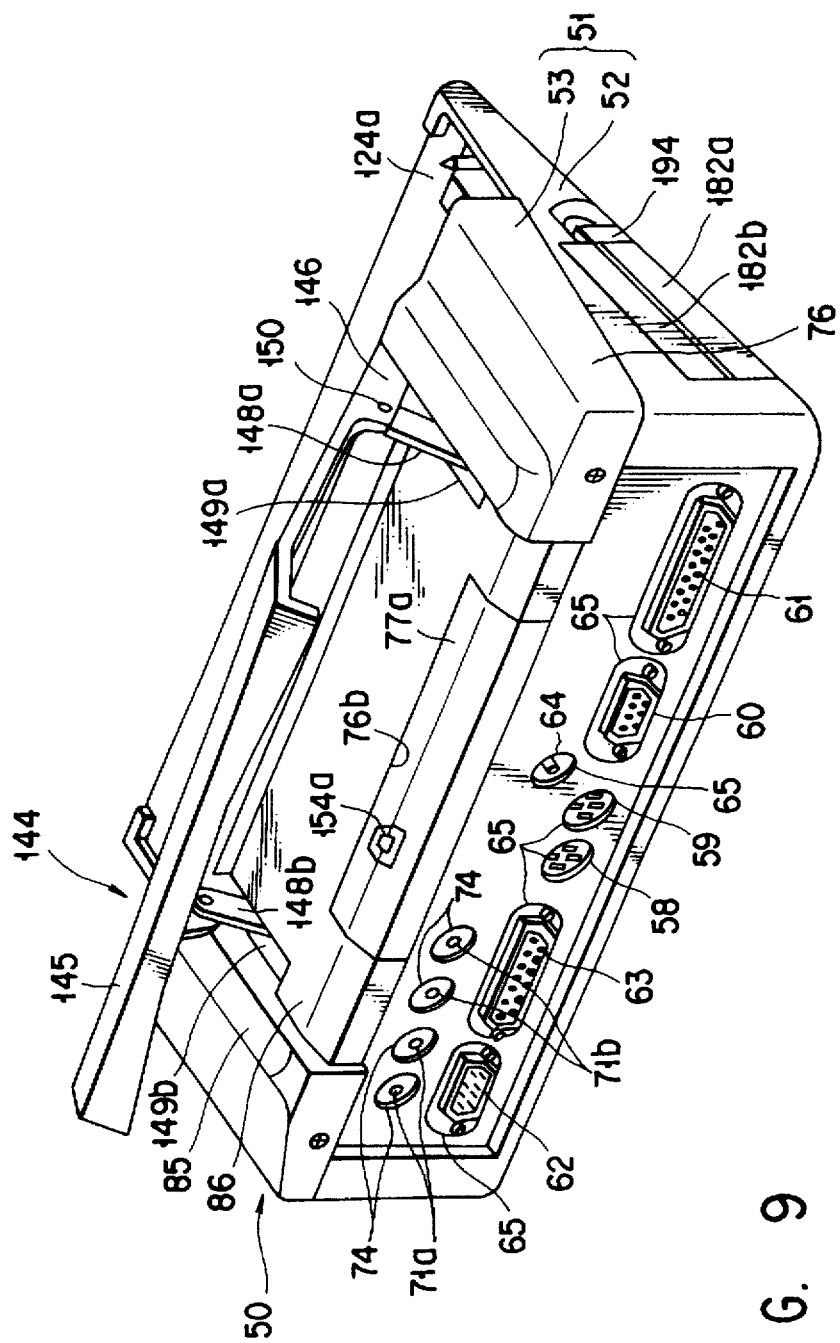

As shown in FIGS. 8 and 9, the voice input and output terminals 71a and 71b are exposed at the back of the lower housing 52 through their corresponding openings 74 which are formed in the rear face of the housing 52. As shown in FIG. 7, the volume dial 72 is exposed to the outside through another opening 74 which is formed in the side face 55d of the lower housing 52 and a side face of the upper housing 53.

As shown in FIGS. 10 and 14, furthermore, a second stacking connector 75 is attached to the underside of the sub-circuit board 70. The connector 75 is connected to the first stacking connector 67 on the main circuit board 56. Thus, the sub-circuit board 70 is connected electrically to the main circuit board 56 through the first and second stacking connectors 67 and 75.

The voice input and output terminals 71a and 71b, along with the ports 60, 61 and 63, connectors 58, 59 and 62, and DC power supply terminal 64, individually constitute branch connectors according to the present invention.

As shown in FIGS. 7 to 11, 14 and 15, the upper housing 53 comprises a housing body 76, which has an opening 76a and another opening 76b (mentioned later) in the center, and a connector supporter 77 which is fitted in the openings 76a and 76b so as to be fixed to the housing body 76 and support a second expansion connector (mentioned later).

The housing body 76 has a rectangular profile similar to that of the lower housing 52, and is fitted on the lower housing 52 from above. The housing body 76 is connected to the lower housing 52 in a manner such that its front end portion is screwed to the front end portion of the bottom face of the lower housing 52 and that its rear end is screwed to the support pieces 69a and 69b of the connector panel 68.

The upper housing 53 has a substantially flat bearing surface 81 in the front half of its top face, which serves to carry the computer 1 thereon. The bearing surface 81 is continuously open to the front and both lateral sides of the housing 51, and has a size substantially corresponding to the rear half of the bottom face 2a of the computer 1. When the computer 1 is placed on the bearing surface 81, therefore, the front half of the computer 1 projects toward an operator. In the present embodiment, the bearing surface 81 extends declining from its rear end toward the operator.

The connector supporter 77 has a flat connector setting surface 82 which rises substantially vertically from the rear end of the bearing surface 81. Also, the housing body 76 is provided with a pair of stopper faces 84a and 84b, left and right, which rise substantially vertically from the rear end of the bearing surface 81 on either side of the connector setting surface 82 so as to be substantially flush with the surface 82.

As shown in FIGS. 9 and 14, a top face 85 of the housing body 76 extends from the respective upper ends of the stopper faces 84a and 84b to the rear end of the body 76, and also extends in the width direction of the body 76. The top face 85 is formed having a substantially rectangular recess 86 which is situated behind the connector setting surface 82. At the rear end portion of the housing body 76, the opening 76b is formed in the bottom face of the recess 86, and a projection 77a on the rear end of the connector supporter 77 is fitted in the opening 76b, thus constituting part of the bottom face of the recess 86.

The upper housing 53, constructed in this manner, is provided with a second expansion connector 87 which serves as a second connector connectable with the first expansion connector 14 of the computer 1, a loading-unloading mechanism 98 for moving the computer 1 on the bearing surface 81 toward and away from the second expansion connector 87, and the sensor unit of the sensing means for detecting the operation of the mechanism 98.

More specifically, as shown in FIGS. 10, 11, 12, 14, etc., the second expansion connector 87, which is removably connectable with the first expansion connector 14 of the computer 1, is attached to the central portion of the connector setting surface 82. The second expansion connector 87 includes a connector body 87a, in the form of an elongated box extending in the width direction of the setting surface 82, and a pair of positioning pins 87b arranged on either side of the body 87a.

The positioning pins 87b can be removably inserted into the positioning holes 16 of the first expansion connector 14. The respective distal ends of the pins 87b project longer from the connector setting surface 82 than the connector body 87a. The first and second expansion connectors 14 and 87 are positioned with respect to each other by inserting the positioning pins 87b individually into the positioning holes 16.

A flexible wiring board 88 extends from the second expansion connector 87, and a pair of second junction connectors 90a and 90b, which are formed of a stacking connector each, are mounted on an extending end portion of the board 88. The connectors 90a and 90b are spaced in parallel relation.

The second junction connectors 90a and 90b are connected to the first junction connectors 66a and 66b, respectively, on the main circuit board 56 in the lower housing 52. Thus, the second expansion connector 87 is connected to the ports 60, 61 and 63, connectors 58, 59 and 62, DC power supply terminal 64, and voice input and output terminals 71a and 71b through the flexible wiring board 88, first and second junction connectors 66a, 66b, 90a and 90b, main circuit board 56, sub-circuit board 70, etc. In this arrangement, signals applied to the single second expansion connector 87 can be distributed to the ports, connectors, or various terminals described above.

As seen from FIGS. 12 and 14, the second junction connectors 90a and 90b are mounted on the flexible wiring board 88 in a manner such that the distance between them is longer than the distance (L) between the first junction connectors 66a and 66b. Thus, when the second junction connectors 90a and 90b are connected to the first junction connectors 66a and 66b, respectively, a portion 88a of the wiring board 88 which is situated between the second junction connectors 90a and 90b is bent.

A cover operating member 92 is provided on the connector setting surface 82. The member 92, which is used to open and close the cover unit 21 of the computer 1, is located adjacent to one side of the second expansion connector 87. As shown in FIGS. 5 and 6, the operating member 92 includes a push plate 93 and a shaft portion 94 extending rearward from the plate 93. The push plate 93 can project and retract from the connector setting surface 82, and the shaft portion 94 projects into the upper housing 53.

The cover operating member 92 is urged to project from the connector setting surface 82 by means of a spring 95 which is wound on the shaft portion 94. Normally, the member 92 projects a predetermined length from the setting surface 82. A distal end portion 93a of the push plate 93 projects longer from the connector setting surface 82 than the positioning pins 87b.

The push plate 93 has cam faces 96a and 96b at the upper and lower corner portions of its distal end portion 93a. The cam faces 96a and 96b are slanted in the directions to approach each other with distance from the connector setting surface 82. Thus, having the cam faces 96a and 96b, the distal end portion 93a of the push plate 93 is tapered so that it can be inserted into the inlet aperture 35 of the cover unit 21.

When the distal end portion 93a of the push plate 93 is inserted into the inlet aperture 35, the cam faces 96a and 96b come into sliding contact with the guide faces 36a and 36b of the open-close guide portions 34a and 34b, respectively. Thereupon, the upper and lower covers 23a and 23b are vertically swung open in opposite directions around the shafts 28a, 28b, 29a and 29b.

Figure 13:
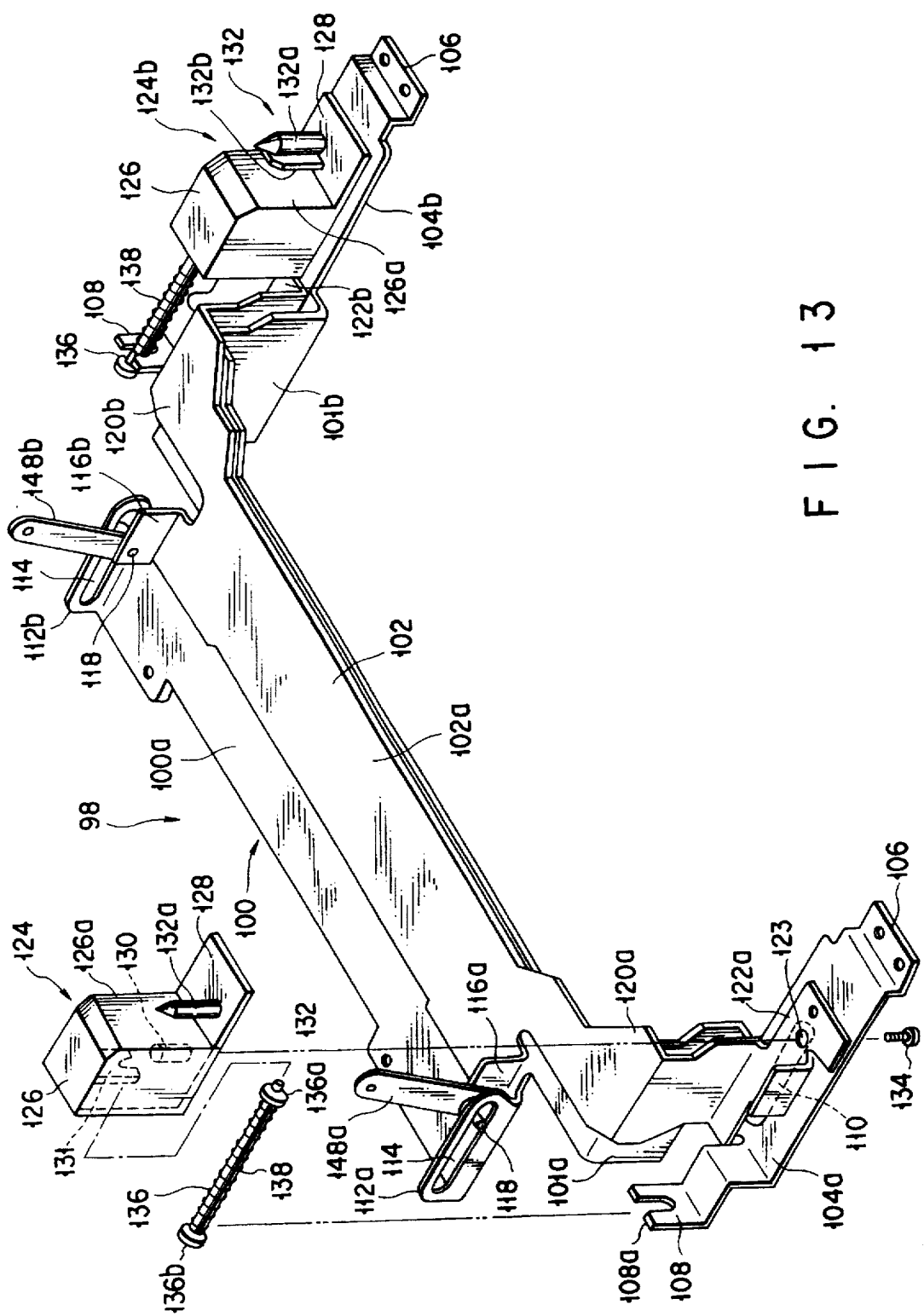
Figure 15:
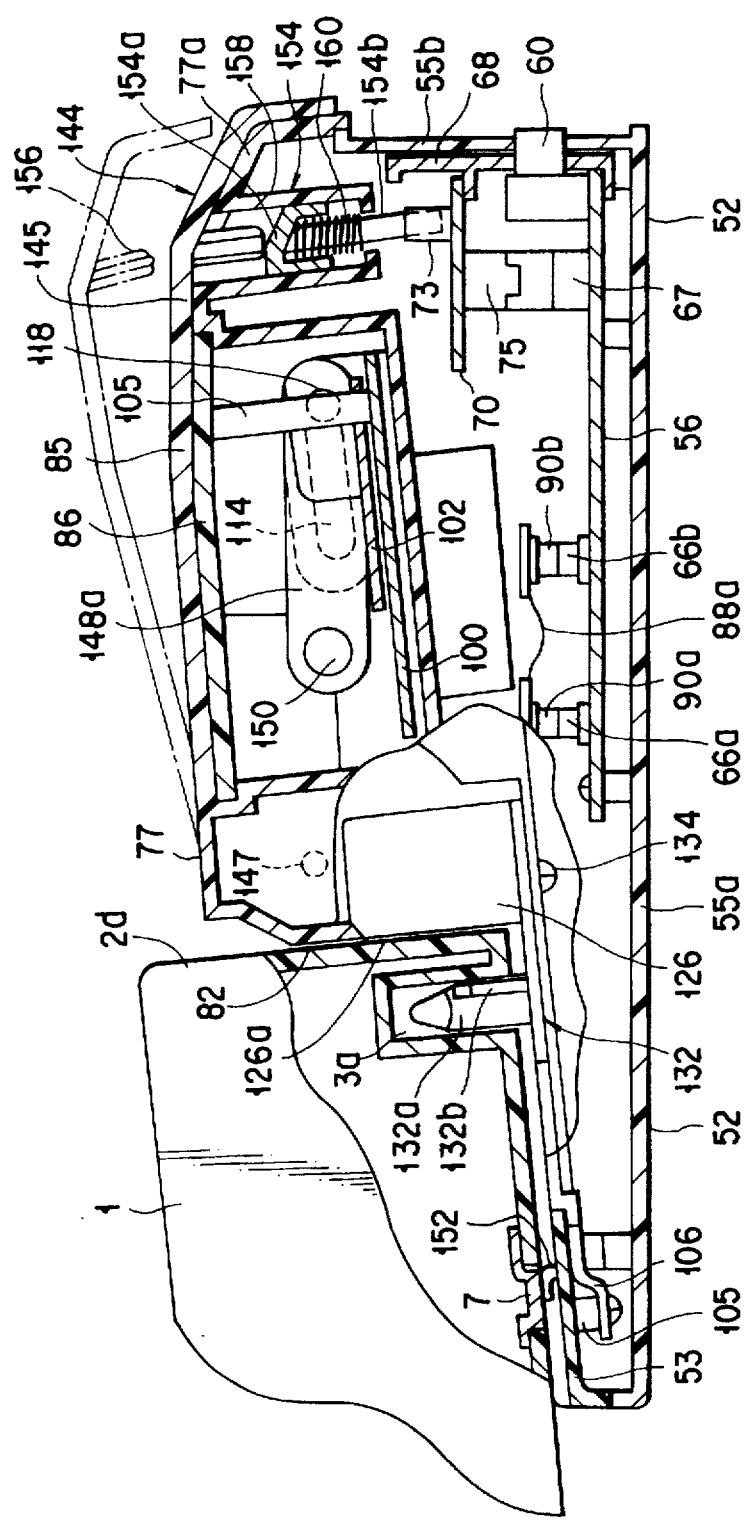

As shown in FIGS. 13 to 15, on the other hand, the loading-unloading mechanism 98 serving as operating means comprises a metallic base frame 100 fixed to the inner surface of the housing body 76 of the upper housing 53 and a metallic slide plate 102 slidably supported on the frame 100. The base frame 100 has a planar frame body 100a which is long enough to cover the overall width of the upper housing 53. The frame body 100a is declined forward so to extend along the bearing surface 81.

The base frame 100 includes arm portions 101a and 101b which extend sideways and downward from the opposite side edges of the body 100a, and slide guides 104a and 104b are formed on the extending ends of the arm portions 101a and 101b, respectively. The slide guides 104a and 104b extend in the depth direction of the upper housing 53, and are declined forward along the bearing surface 81. The guides 104a and 104b are situated individually under the opposite side portions of the bearing surface 81.

A downwardly bent support piece 106 is formed integrally on the front end portion of each of the slide guides 104a and 104b. The rear end portion of each slide guide is bent upward to form a spring bearing 108 which has a notch 108a. Also, each slide guide is formed having a guide slot 110 which extends in the depth direction of the upper housing 53.

Upwardly bent guide walls 112a and 112b are formed integrally on the opposite end portions, left and right, of the frame body 100a of the base frame 100. The guide walls 112a and 112b extend in the depth direction of the upper housing 53. The guide walls 112a and 112b have their respective slide slots 114, which extend in the depth direction of the upper housing 53 and are declined forward along the bearing surface 81.

The base frame 100 constructed in this manner is fixed to the inner surface of the upper housing 53 in a manner such that the rear end portion of the body 100a and the pair of support piece 106 are screwed to a plurality of bosses 105 which protrude from the inner surface of the housing 53.

On the other hand, the slide plate 102 includes a planar body 102a which overlies the frame body 100a of the base frame 100. Set up individually on the opposite side edges of the body 102a are a pair of support walls 116a and 116b, left and right, which face the guide walls 112a and 112b of the base frame 100, respectively. Each of the support walls 116a and 116b is fitted with a guide pin 118, which is slidably fitted in the slide slot 114 of its corresponding guide wall 112a or 112b.

Thus, the slide plate 102 is supported on the base frame 100 so that it can slide in the depth direction of the upper housing 53, guided by the combinations of the guide pins 118 and the slide slots 114 in engagement with one another.

Further, the slide plate 102 includes a pair of arm portions 120a and 120b, left and right, which protrude individually from the opposite side edges of the body 102a, and extend sideways and downward along the outside of the arm portions 101a and 101b of the base frame 100, respectively. Bracket portions 122a and 122b are formed on the extending ends of the arm portions 120a and 120b, respectively. The bracket portions 122a and 122b extend in the depth direction of the upper housing 53, and are declined forward along the bearing surface 81. The bracket portions 122a and 122b are in the form of a flat plate each, and are slidably put on the upper surfaces of the slide guides 104a and 104b, respectively.

Each of the bracket portions 122a and 122b is formed having a through hole 123, which faces the guide slot 110 of its corresponding slide guide 104a or 104b. Also, the bracket portions 122a and 122b are fitted with hook units 124a and 124b, respectively, which are caught by the casing 2 of the computer 1 when the computer 1 is placed on the bearing surface 81. The hook units 124a and 124b are formed integrally from synthetic resin, and are symmetrical with each other. The following is a description of the arrangement of the one hook unit 124a only.

As shown in FIGS. 7, 13, 14, 15, etc., the hook unit 124a includes a substantially box-shaped hollow holder portion 126, which is open-backed and -bottomed, and a base 128 in the form of a rectangular plate extending forward from the lower part of a front face 126a of the holder portion 126. Formed in the holder portion 126 are a boss portion 130 having a tapped hole and a spring bearing 131 having a notch.

From the base 128 protrudes an engaging projection 132 as an engaging portion according to the present invention which is adapted to engage the fitting hole 3a of the computer 1. The engaging projection 132, which faces the front face 126a of the holder portion 126, is formed of a cylindrical portion 132a and a flat plate portion 132b which are adapted to be fitted in the cylindrical portion 4a and the groove portion 5a, respectively, of the fitting hole 3a of the computer 1.

The hook unit 124a is fixed to the bracket portion 122a by means of a screw 134 which is screwed into the boss portion 130 through the through hole 123 in the bracket portion 122a. A guide rod 136 is stretched between the spring bearing 131 of the holder portion 126 and the spring bearing 108 of the base frame 100.

The guide rod 136 has a disk-shaped spring seat 136a and a disk-shaped stopper 136b on its front and rear ends, respectively. The spring seat 136a is in engagement with the notch of the spring bearing 131. The rear end portion of the guide rod 136 penetrates the notch 108a of the spring bearing 108 for sliding motion in the depth direction. A compression coil spring 138 for use as a return spring is fitted on the outer peripheral surface of the guide rod 136. The spring 138 is held abutting against the spring seat 136a and the spring bearing 108, and urges the hook unit 124a forward. Thus, the slide plate 102, to which the hook units 124a and 124b are screwed, is forwardly urged together with the hook units by the springs 138.

On the opposite sides of the bearing surface 81 of the upper housing 53, as shown in FIG. 7 and other drawings, openings 140a and 140b are formed extending forward from the stopper faces 84a and 84b, respectively. The respective bases 128 of the hook units 124a and 124b are slidable in their corresponding openings 140a and 140b, and their surfaces are flush with the bearing surface 81. The respective holder portions 126 of the hook units 124a and 124b are located in their corresponding openings 141a and 141b.

As the hook units 124a and 124b move, the holder portions 126 can project and retract from the stopper faces 84a and 84b through the openings 141a and 141b, respectively.

As shown in FIGS. 9, 11, 13, 14, 15, etc., on the other hand, the loading-unloading mechanism 98 comprises an operating lever 144 as an operating member for sliding the slide plate 102 in the depth direction. The lever 144 includes a lever body 145 in the form of a substantially rectangular flat plate, which can be housed in the recess 86 in the top face of the upper housing 53, and a pair of arm portions 146 extending individually from the opposite side edges of the lever body 145. The respective front end portions of the arm portions 146 are swingably supported on the upper housing 53 by means of pivots 147, individually.

Thus, the operating lever 144 is supported on the upper housing 53 so as to be swingable between a release position shown in FIGS. 9 and 14, in which it is raised at a predetermined angle to the top face 85 of the housing 53, and a home position shown in FIGS. 7, 8, 15, etc., in which the lever body 145 is housed in the recess 86 so that its upper surface is flush with the top face 85 of the housing 53.

As shown in FIGS. 9, 13, 14 and 15, the operating lever 144 is connected to the slide plate 102 by means of toggle links 148a and 148b. One end of each toggle link is rotatably connected to the middle portion of its corresponding arm portion 146 by means of a pivot 150, while the other end of the link is rotatably connected to its corresponding guide pin 118. The toggle links 148a and 148b extend through slits 149a and 149b in the top face of the upper housing 53, respectively. The pivots 150, for use as junctions between the operating lever 144 and the toggle links 148a and 148b, are situated behind the pivots 147 which are junctions between the lever 144 and the upper housing 53. The range of swinging motion of the operating lever 144 is defined by the toggle links 148a and 148b.

When the operating lever 144 is swung up toward the release position, the junctions between the lever 144 and the toggle links 148a and the 148b move upward as they are pulled forward. Thus, the rising angle of the toggle links 148a and 148b becomes wider, so that the guide pins 118 move forward along their corresponding slide slots 114. The upward swing of the operating lever 144 is stopped when each guide pin 118 reaches the front end of its corresponding slide slot 114. Thereupon, the lever 144 is situated in the release position where its rising angle has a maximum value.

When the operating lever 144 is swung down toward the home position, as shown in FIG. 15, the junctions between the lever 144 and the toggle links 148a and 148b move downward as they are pushed out rearward. The links 148a and 148b are gradually laid down so that they extend substantially parallel to the slide plate 102. Thus, the guide pins 118 move back along the slide slots 114. The downward swing of the operating lever 144 is stopped when each guide pin 118 reaches the rear end of its corresponding slide slot 114. Thereupon, the rising angle of the lever 144 has a minimum value, and the lever 144 is housed in the recess 86 of the upper housing 53.

As the operating lever 144 swings in this manner, the slide plate 102 slides back and forth, so that the pair of hooks units 124a and 124b on the plate 102 also slide in the depth direction.

When the operating lever 144 is swung up to the release position, as shown in FIGS. 9 and 14, the slide plate 102, along with the guide pins 118, move forward, and the pair of hook units 124a and 124b also move forward along the bearing surface 81 to a second position shown in FIG. 14. In this second position, the respective engaging projections 132 of the hook units 124a and 124b are fully separated from the stopper faces 84a and 84b which are flush with the connector setting surface 82. In this position, moreover, the holder portions 126 project from their corresponding stopper faces 84a and 84b, and their respective front faces 126a are situated ahead of the positioning pins 87b of the second expansion connector 87 and the cover operating member 92.

When the operating lever 144 is swung down to the home position, as shown in FIGS. 7, 8, 15, etc., the slide plate 102, along with the guide pins 118, moves rearward, and the pair of hook units 124a and 124b also move back along the bearing surface 81 to a first position shown in FIG. 7. In this first position, the respective engaging projections 132 of the hook units 124a and 124b are situated adjacent to the stopper faces 84a and 84b which are flush with the connector setting surface 82, and the respective front faces 126a of the holder portions 126 are flush with the stopper faces 84a and 84b.

On the opposite sides of the front end portions of the upper housing 53, as shown in FIGS. 7, 14, 15, etc., a pair of contact pieces 152 are exposed on the bearing surface 81. The contact pieces 152 penetrate the bearing surface 81 and extend to the inside of the upper housing 53. The pieces 152 are fixed to the inner surface of the upper housing 53, and are connected electrically to the slide guides 104a and 104b of the base frame 100. When the computer 1 on the bearing surface 81 is moved toward the connector setting surface 82, the contact pieces 152 are brought into electrical contact with their corresponding terminal plates 7 which are exposed on the bottom face 2a of the computer 1.

As shown in FIGS. 8 to 11, 14 and 15, the sensing means for detecting the operation of the loading-unloading mechanism 98 includes an actuating piece 154 and a push projection 156. The actuating piece 154, which is provided on the projection 77a of the connector supporter 77, constitutes the sensor unit in conjunction with the photointerrupter 73. The projection 156 is provided on the lever body 145 of operating lever 144, and functions as a moving part.

More specifically, a cylindrical guide sleeve 158 protrudes downward from the inside of the projection 77a of the connector supporter 77. The sleeve 158 has its upper end opening in the upper surface of the projection 77a, and its lower end is closed. The guide sleeve 158 is situated over the photointerrupter 73 which is mounted on the sub-circuit board 70 in the lower housing 52.

The actuating piece 154 includes a head portion 154a, which is slidable in the guide sleeve 158 in the axial direction thereof, and an actuating rod 154b extending downward from the head portion 154a. The lower end portion of the rod 154b penetrates the bottom wall of the sleeve 158 and extends downward.

A compression coil spring 160 is wound on the actuating rod 154b, and is interposed between the head portion 154a and the bottom of the guide sleeve 158. Thus, the actuating piece 154 is urged upward by the spring 160. Normally, the piece 154 is moved to a nonoperating position in which the head piece 154a is flush with the upper surface of the projection 77a, and is held therein by means of a stopper (not shown).

On the other hand, the push projection 156 protrudes downward from the inner surface of the lever body 145, and is situated so that it engages the head portion 154a of the actuating piece 154 when the operating lever 144 is swung down to the home position.

Thus, when the operating lever 144 is swung down from the release position toward the home position, as shown in FIG. 15, the push projection 156 abuts against the head portion 154a of the actuating piece 154, thereby pushing down the piece 154 to an operating position of FIG. 15, resisting the urging force of the compression coil spring 160. Thereupon, the actuating rod 154b of the actuating piece 154 projects downward from the guide sleeve 158, and penetrates the space between light emitting and receiving units of the photointerrupter 73. As a result, the photointerrupter 73 is turned off, whereupon it is detected that operating lever 144 is swung down to the home position.

When the operating lever 144 is swung up from the home position toward the release position, the push projection 156 is separated from the head portion 154a of the actuating piece 154, whereupon the piece 154 is returned to the nonoperating position by the compression coil spring 160. In response to this, the actuating rod 154b retracts from the photointerrupter 73, so that the photointerrupter 73 is turned on. Thereupon, it is detected that the operating lever 144 is swung up to the release position.

Figure 16:
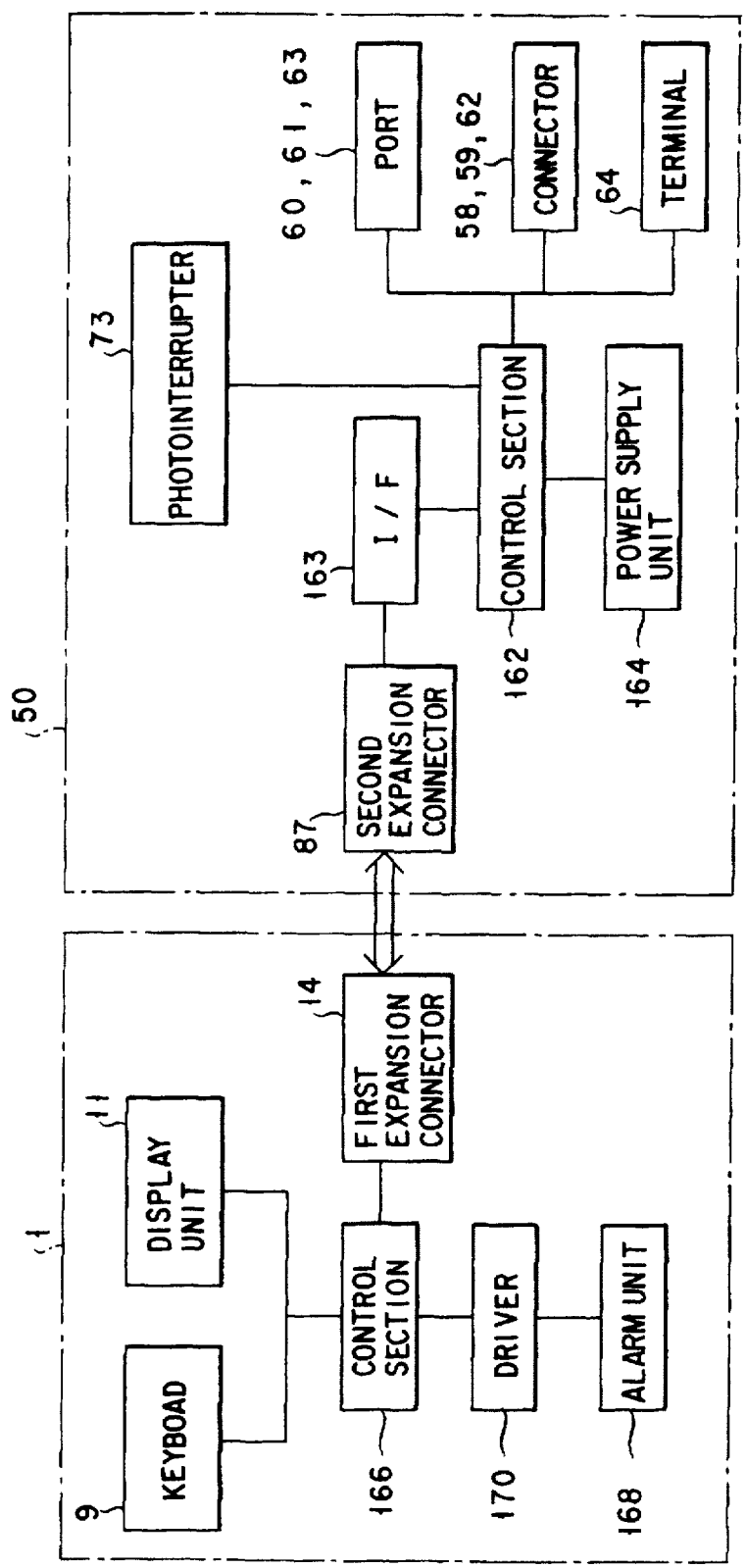

FIG. 16 schematically shows the respective arrangements of the external expanding apparatus 50 and the computer 1. The apparatus 50 comprises a control section 162 which is composed of a CPU and the like and functions as output means according to the present invention. The second expansion connector 87 is connected to the control section 162 through an interface 163. The control section 162 is also connected with a power supply unit 164, the photointerrupter 73, the ports 60, 61 and 63, the connectors 58, 59 and 62, and the DC power supply terminal 64.

The computer 1 comprises a control section 166 which is composed of a CPU and the like, and is connected with the first expansion connector 14, keyboard 9, display unit 11, etc. The control section 166 is also connected with an alarm unit 168, which includes an alarm buzzer, alarm lamp, etc., through a driver 170.

The following is a description of steps of procedure for connecting the computer 1 to the external expanding apparatus 50 in order to extend the function of the computer 1.

Before connecting the computer 1, the operating lever 144 of the external expanding apparatus 50 is first swung toward the release position. By doing this, the hook units 124a and 124b are moved to the second position by means of the slide plate 102, and their respective holder portions 126 are exposed on the bearing surface 81, projecting forward through the openings 141a and 141b of the stopper faces 84a and 84b, respectively.

Subsequently, the rear end portion of the computer 1 is placed on the bearing surface 81 and the respective bases 128 of the hook units 124a and 124b, as shown in FIG. 14. At this time, the engaging projections 132 of the hook units 124a and 124b are fitted into the fitting holes 3a and 3b, respectively, in the bottom face 2a of the computer 1. In this case, the cylindrical portions 132a of the engaging projections 132 are fitted into the cylindrical portions 4a and 4b of the fitting holes 3a and 3b, respectively, and the flat plate portions 132b into the groove portions 5a and 5b, respectively.

As the engaging projections 132 are thus fitted in the fitting holes 3a and 3b, the computer 1 is positioned in both the width and depth directions with respect to the bearing surface 81 and the connector setting surface 82. In this state, the rear face 2d of the computer 1 is in contact with the respective front faces 126a of the holder portions 126 of the hook units 124a and 124b.

After the computer 1 is placed on the bearing surface 81, the operating lever 144 is swung down toward the home position. As this is done, the hook units 124a and 124b are slid toward the first position. Thus, the computer 1, along with the hook units 124a and 124b, is moved toward the connector setting surface 82.

As the computer 1 is moved in this manner, the distal end portion 93a of the push plate 93 of the cover operating member 92 on connector setting surface 82 is inserted into the inlet aperture 35 of the cover unit 21 on the rear face 2d of the computer 1, as shown in FIG. 5. Thereupon, the upper and lower cam faces 96a and 96b, which are continuous with the distal end portion 93a, come into contact with the guide faces 36a and 36b of the open-close guide portions 34a and 34b, respectively, thereby causing the upper and lower covers 23a and 23b to swing open vertically in the opposite directions, resisting the urging force of the torsion coil springs 32a and 32b.

As the computer 1 is further drawn toward the external expanding apparatus 50, the push plate 93 is gradually inserted between the guide faces 36a and 36b, as shown in FIG. 6. When the guide faces 36a and 36b get over the cam faces 96a and 96b, the first and second covers 23a and 23b are swung fully open and penetrate the storage space 18 on either side of the frame 22 in substantially parallel relation. As a result, the connector exposing slot 19 is opened, and the first expansion connector 14 is exposed on the rear face 2d of the computer 1 through the slot 19.

After the first and second covers 23a and 23b are swung open, the positioning pins 87b of the second expansion connector 87 are fitted into the positioning holes 16a and 16b of the first expansion connector 14, individually, before the first and second expansion connectors are connected to each other. In this manner, the first and second expansion connectors 14 and 87 are finally positioned with respect to each other.

When the hook units 124a and 124b are slid to the first position, as shown in FIG. 15, their respective holder portions 126 are housed in the upper housing 53 so that their front faces 126a are flush and continuous with the stopper faces 84a and 84b and the connector setting surface 82. At this point of time, the first expansion connector 14 is joined to the second expansion connector 87, and the computer 1 and the external expanding apparatus 50 are connected electrically to each other by means of the connectors 14 and 87.

By the time the first and second expansion connectors 14 and 87 are joined together, they are already positioned with the positioning pins 87b fitted in the positioning holes 16a and 16b. Accordingly, the connectors 14 and 87 can be joined securely, and there is no possibility of any excessive force being applied to the joint portion.

When the connection between the computer 1 and the external expanding apparatus 50 is completed with the hook units 124a and 124b slid to the first position, the contact pieces 152 at the front end of the bearing surface 81 come into contact with the grounding terminal plates 7 which are exposed on the bottom face 2a of the computer 1, whereby the computer 1 grounded to the apparatus 50.

By the time the first and second expansion connectors 14 and 87 is completed, on the other hand, the operating lever 144 is swung to a connection completion position just short of the home position, as indicated by dashed line in FIG. 15. In this connection completion position, the push projection 156 attached to the operating lever 144 is situated just over the head portion 154a of the actuating piece 154 without engaging it yet.

When the operating lever 144 is swung beyond the connection completion position to the home position after the connection between the first and second expansion connectors 14 and 87 is completed, the lever body 145 of the lever 144 is housed in the recess 86 of the upper housing 53, whereupon it becomes flush with the top face 85 of the housing 53.

As this is done, the push projection 156 of the operating lever 144 abuts against the head portion 154a of the actuating piece 154, thereby pushing down the piece 154 to the operating position, resisting the urging force of the compression coil spring 160, as shown in FIG. 15. Thereupon, the actuating rod 154b of the actuating piece 154 projects downward from the guide sleeve 158, and penetrates between the space between the light emitting and receiving units of the photointerrupter 73. As a results, the photointerrupter 73 is turned off, and delivers an off-signal to the control section 162. In response to this off-signal from the photointerrupter 73, the control section 162 detects that the operating lever 144 is swung down to the home position via the connection completion position and that the first expansion connector 14 of the computer 1 is connected to the second expansion connector 87.

By connecting the computer 1 to the external expanding apparatus 50 in this manner, the computer 1 can be furnished additionally with the various ports 60, 61 and 63, connectors 58, 59 and 62, DC power supply terminal 64, and voice input and output terminals 71a and 71b. By connecting a plurality of peripheral devices, such as the printer, HDD, etc., to these ports, connectors, and terminals, moreover, the peripheral devices can be connected simultaneously to the computer 1.

In removing the computer 1 from the external expanding apparatus 50, on the other hand, the operating lever 144 is swung up from the home position toward the release position via the connection completion position. As this is done, the slide plate 102 is slid forward, and the hook units 124a and 124b are pushed out to the second position. As a result, the computer 1 is moved away from the connector setting surface 82 by the respective engaging projections 132 of the hook units 124a and 124b and the front faces 126a of the holder portions 126, whereupon the first and second expansion connectors 14 and 87 are disconnected from each other. In this state, the computer 1 can be removed from the external expanding apparatus 50.

After the first and second expansion connectors 14 and 87 are disconnected in this manner, the push plate 93 of the cover operating member 92 is drawn out from between the open-close guide portions 34a and 34b of the cover unit 21. As a result, the first and second covers 23a and 23b are swung to the closed position by the torsion coil springs 32a and 32b, thereby closing the connector exposing slot 19 of the computer 1 and concealing the first expansion connector 14.

When the operating lever 144 is swung from the home position shown in FIG. 15 toward the release position to reach the connection completion position, with the computer 1 connected to the external expanding apparatus 50 and the power supply, the push projection 156 of the lever 144 is separated from the head portion 154a of the actuating piece 154, whereupon the piece 154 is returned to the nonoperating position shown in FIG. 14 by the compression coil spring 160. In response to this, the actuating rod 154b retracts from the photointerrupter 73, so that the photointerrupter 73 is turned on, and delivers an on-signal to the control section 162.

In response to this on-signal, the control section 162, which functions as the output means according to the present invention, detects that the operating lever 144 is swung from the home position toward the release position, that is, the disconnection of the computer 1 is started, and outputs a warning signal. This warning signal is delivered to the control section 166 of the computer 1 via the interface 163, second expansion connector 87, and first expansion connector 14. In response to the warning signal, the control section 166 drives the driver 170 to actuate the alarm unit 168, which includes the alarm buzzer, alarm lamp, etc., thereby warning the operator of the start of the disconnection of the computer 1. At the same time, the control section 166 displays a warning message on the display unit 11 such that the user is order to save a running program, data, etc.

Even in case the operating lever 144 is swung up to the release position by mistake during the operation of the computer 1, therefore, the operator can be warned or cautioned by the time the lever is swung to the connection completion position. Actually, the first and second expansion connectors 14 and 87 are disconnected while the operating lever 144 is being swung from the connection completion position to the release position. Accordingly, the operator can maintain the connection between the connectors 14 and 87 by stopping the swinging motion of the lever 144 when the aforesaid warning is given, that is, when the lever 144 is swung to the connection completion position.

Thus, the operating lever 144 can be prevented from being erroneously swung to disconnect the computer 1 from the external expanding apparatus 50 during use of the computer 1, and therefore, unexpected erasure of in-process data, malfunction, etc. can be prevented.

As shown in FIGS. 7 to 10, 17, etc., the external expanding apparatus 50 comprises first and second card storage units 172a and 172b arranged in the lower housing 52 on either side of the rear end portion thereof. The card storage units 172a and 172b have their respective inlet slots opening in the left- and right-hand side faces 55c and 55d of the lower housing 52, and are adapted to be loaded individually with IC cards based on, e.g., the PCMCIA standards for use as card-shaped electronic components. Since the first and second card storage units 172a and 172b are constructed in the same manner, the construction of the second unit 172b will be described representatively.

Figure 17:
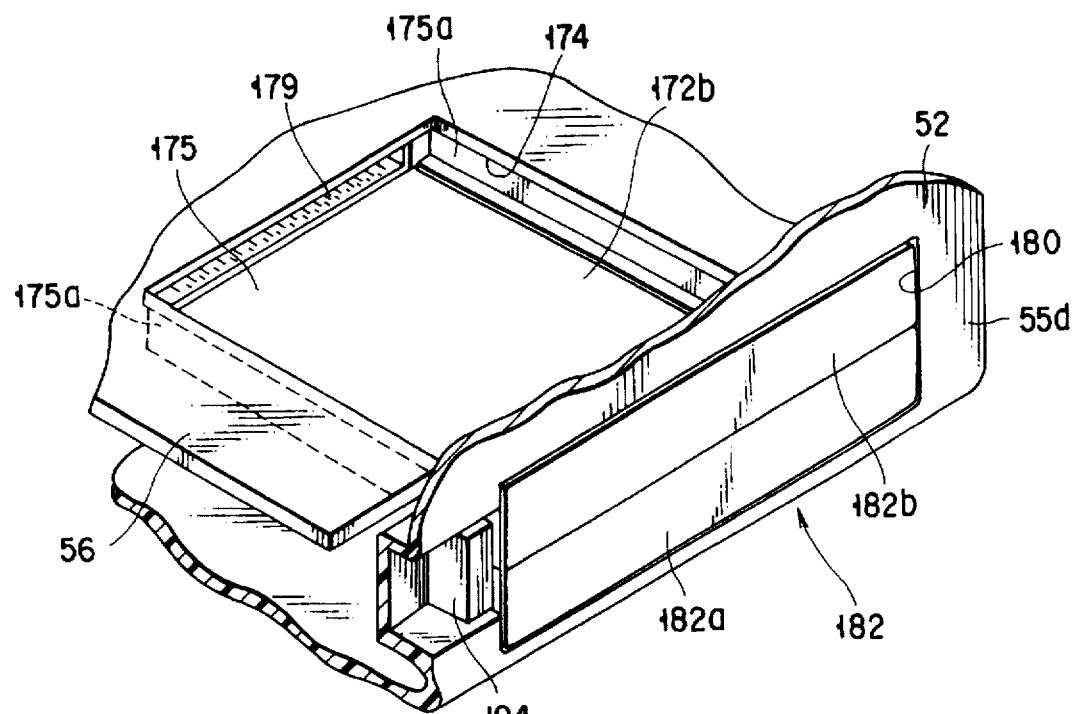
Figure 18:
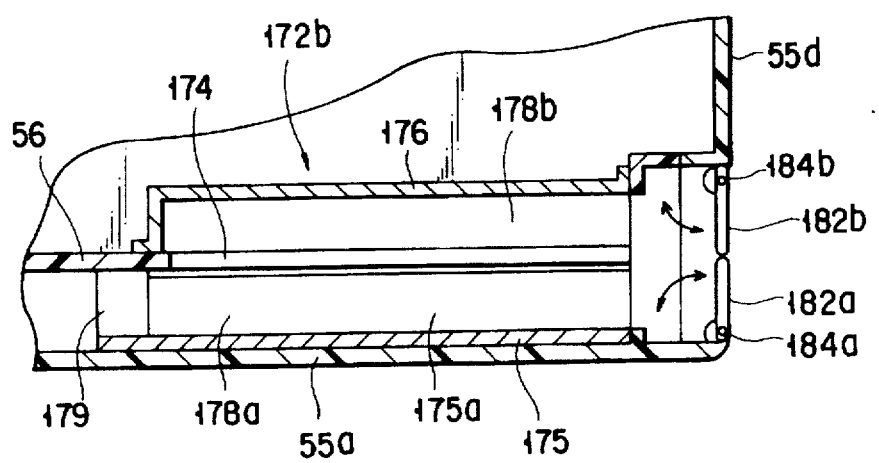

As shown in FIGS. 10, 17 and 18, the second card storage unit 172b is defined by a rectangular notch 174 formed on the right-hand portion of the main circuit board 56 and extending in the width direction of the lower housing 52, a rectangular lower cover 175 fixed to the lower surface of circuit board 56 so as to cover the notch 174, and a rectangular upper cover 176 attached to the upper surface of the circuit board 56 so as to cover the notch 174. Both side edge portions of the lower cover 175 are bent upward, thus forming a pair of guide walls 175a which extends in the width direction of the lower housing 52 along the opposite side edges of the notch 174.

The second card storage unit 172b includes a flat rectangular first storage section 178a, which is defined by the lower cover 175 having the pair of guide walls 175a and situated under the main circuit board 56, and a flat rectangular second storage section 178b, which is defined by the upper cover 176 and situated over the circuit board 56. The first storage section 178a is wider than the second storage section 178b, and communicates with the second section 178b by means of the notch 174. Located at the inner end of the first storage section 178a is a connector 179 which is fixed to the lower surface of the main circuit board 56.

Further, the second card storage unit 172b has a rectangular inlet slot 180 which opens in the side face 55d of the lower housing 52. The inlet slot 180 is provided with a cover 182 for opening and closing the slot 180. The cover 182 is composed of first and second cover members 182a and 182b which are vertically divided in the thickness direction of the inlet slot 180.

The first and second cover members 182a and 182b are formed individually of elongated flat plates each having a shape substantially obtained by vertically dividing the inlet slot 180. The first cover member 182a has a pair of pivots 184a protruding individually from the respective lower ends of the opposite side edges thereof, a pair of stoppers 185a protruding individually from the respective upper end portions of the opposite side edges, and a spring bearing portion 186a formed on the central portion of the lower edge of the member 182a. The first cover member 182a is integrally formed of a synthetic resin.

The pivots 184a of the first cover member 182a are rotatably supported on a pair of first bearing portions 188a which are formed on the side face 55d of the lower housing 52 inside the inlet slot 80 and situated near the respective lower ends of the opposite end portions of the slot 180. Thus, the first cover member 182a is swingable between a closed position in which it closes the lower half of the inlet slot 180 and an open position in which it is situated inside the slot 180 so that the lower half of the slot 180 is open. Normally, the first cover member 182a is held in the closed position by means of a torsion spring 189a which is anchored to the spring bearing portion 186a.

Likewise, the second cover member 182b has a pair of pivots 184b protruding individually from the respective upper ends of the opposite side edges thereof, a pair of stoppers 185b protruding individually from the respective lower end portions of the opposite side edges, and a spring bearing portion 186b formed on the central portion of the upper edge of the member 182a. The second cover member 182b is integrally formed of a synthetic resin.

The pivots 184b of the second cover member 182b are rotatably supported on a pair of second bearing portions 188b which are formed on the side face 55d of the lower housing 52 inside the inlet slot 80 and situated near the respective upper ends of the opposite end portions of the slot 180. Thus, the second cover member 182b is swingable between a closed position in which it closes the upper half of the inlet slot 180 and an open position in which it is situated inside the slot 180 so that the upper half of the slot 180 is open. Normally, the second cover member 182b is held in the closed position by means of a torsion spring 189b which is anchored to the spring bearing portion 186b.

In the closed position, the first and second cover members 182a and 182b butt against each other so that they are flush and continuous with each other and with the side face 55d of the lower housing 52. In the open position, the first and second cover members 182a and 182b are housed inside the inlet slot 180 so that they are situated substantially at right angles to the side face 55d and face each other in parallel relation with the slot 180 between them.

Constructed in this manner, the second card storage unit 172b can be alternatively loaded with IC cards of two thicknesses. The first storage section 178a is formed having an extent and thickness such that it can contain a relatively thin IC card of Type 1 or 2 based on the PCMCIA standards. When the first and second storage sections 178a and 178b are joined together, the resulting structure has an extent and thickness such that it can contain an IC card of Type 3 based on the PCMCIA standards, which is substantially twice as thick as the IC card of Type 1 or 2.

Figure 20:
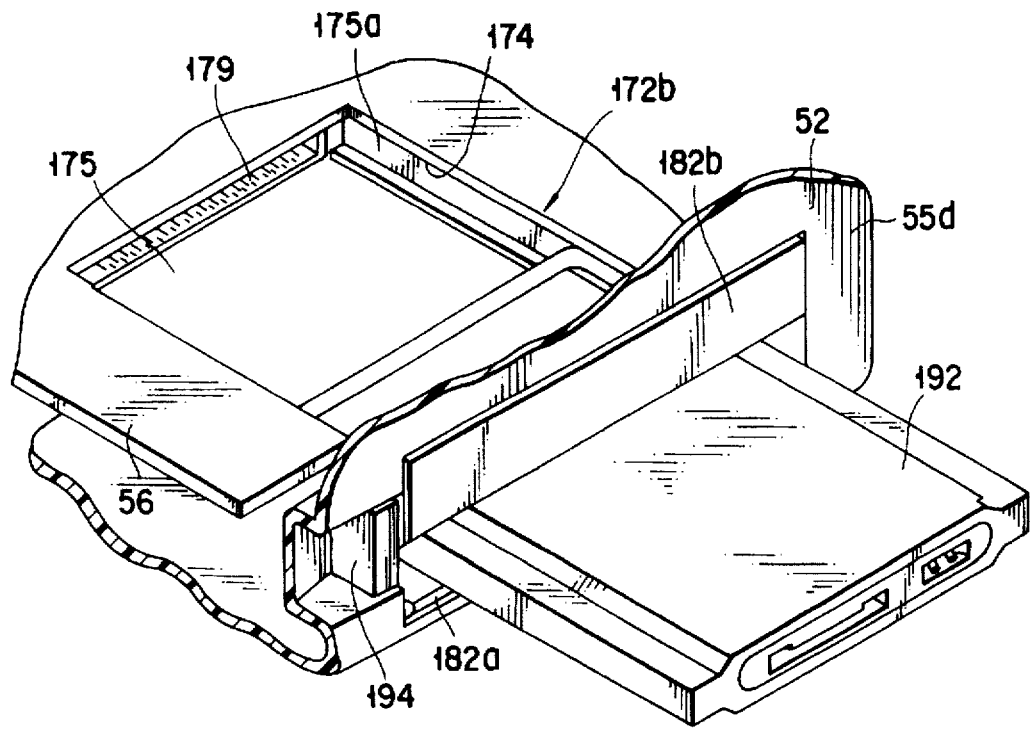

In the case where a facsimile modem card 192, for example, is loaded as an IC card of Type 1 into the second card storage unit 172b, as shown in FIG. 20, the card 192 is inserted into the first storage section 178a in a manner such that its insert end is opposed to the first cover member 182a. Thereupon, the first cover member 182a is pressed by the card 192 and swung to the closed position inside the inlet slot 180, resisting the urging force of the torsion spring 189a, whereby the lower half of the slot 180 is opened.

When the facsimile modem card 192 is further pushed in, it slides along the guide walls 175a to be stored in the first storage section 178a. Then, a connector (not shown) attached to the insert end of the card 192 is connected to the connector 179 in the storage section 178a, and the card 192 is held in the storage section 178a. Thus, the facsimile modem card 192 is connected to the computer 1 through the external expanding apparatus 50, whereby the computer 1 can be furnished with a facsimile function.

In this case, the second cover member 182b is held in the closed position, and closes the upper half of the inlet slot 180. Thus, with the first storage section 178a loaded with the facsimile modem card 192, the inlet slot 180 is kept closed by the rear end portion of the card 192 and the second cover member 182b.

Figure 21:
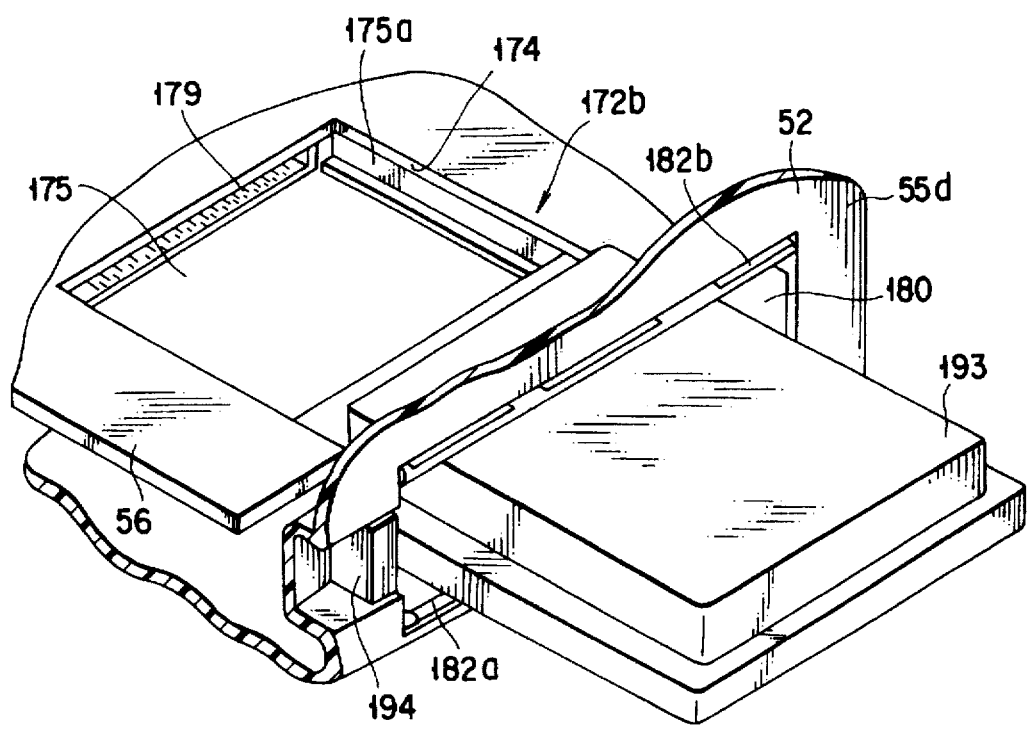

In the case where a hard disk drive (hereinafter referred to as HDD) 193, for example, is loaded as an IC card of Type 3 into the second card storage unit 172b, as shown in FIG. 21, on the other hand, the HDD 193 is inserted into the inlet slot 180 in a manner such that its insert end is opposed to the first and second cover members 182a and 182b.

The lower half of the HDD 193 is formed having the same width with Types 1 and 2, while the upper half is narrower.

As the HDD 193 is inserted, the first and second cover members 182a and 182b are pushed by the HDD 193 and swung to the closed position inside the inlet slot 180, resisting the urging force of the torsion springs 189a and 189b, whereby the slot 180 is opened entire.

When the HDD 193 is further pushed in, its lower half slides along the guide walls 175a to be stored in the first storage section 178a, while its upper half is stored in the second storage section 178b. Then, a connector (not shown) attached to the insert end of the lower half of the HDD 193 is connected to the connector 179 in the first storage section 178a, and the HDD 193 is held in the first and second storage section 178a and 178b. Thus, the HDD 193 is connected to the computer 1 through the external expanding apparatus 50, whereby the memory capacity of the computer 1 can be increased.

With the first and second storage sections 178a and 178b loaded with the HDD 193, the inlet slot 180 is kept closed by the rear end portion of the HDD 193.

The card 192 or HDD 193 can be ejected from the second card storage unit 172b by means of an ejector mechanism (not shown) by depressing an ejector button 194 which is located beside the inlet slot 180.

When the operating lever 144 is swung from the home position to the release position with the computer 1 connected to the external expanding apparatus 50 constructed in this manner, this swinging motion is detected by the photointerrupter 73 and the actuating piece 154, which constitute the sensor unit, and the push projection 156 for use as a sensed unit. When the swinging motion of the operating lever 144 is detected by the sensing means, the control section 162 delivers a warning signal to the computer 1, thereby actuating the alarm unit 168 and the display unit 11 of the computer 1. Accordingly, the operator can be warned of the start of the disconnection of the computer 1 by the alarm unit 168 and the display unit 11. Thus, the operating lever 144 can be prevented from being erroneously swung to disconnect the computer 1 from the external expanding apparatus 50 during use of the computer 1, and therefore, unexpected erasure of in-process data, malfunction, etc. can be prevented.

The sensing means for detecting the swinging motion of the operating lever 144 is not limited to the combination of the photointerrupter 73, actuating piece 154, etc., and may be composed of various sensors, detecting switches, etc. For example, the upper housing 52 may be provided with a microswitch, in place of the photointerrupter 73 and the actuating piece 154. In this case, the microswitch is operated by means of the push projection 156 of the operating lever 144, thus ensuring the same effects as aforesaid.

According to the external expanding apparatus described above, the second junction connectors 90a and 90b are mounted on the extending end portion of the flexible wiring board 88, which extends from the second expansion connector 87, in a manner such that the distance between them is longer than the distance L between the first junction connectors 66a and 66b which are mounted on the main circuit board 56. Thus, in connecting the second junction connectors 90a and 90b to the first junction connectors 66a and 66b, respectively, the distance between the second connectors 90a and 90b can be easily made equal to the distance L between the first connectors 66a and 66b by bending the portion 88a of the wiring board 88 which is situated between the second connectors 90a and 90b.

Even in case there is some deviation between the mounting positions of the second junction connectors 90a and 90b when the external expanding apparatus is assembled, therefore, these junction connectors can be easily connected to the first junction connectors 66a and 66b. Thus, the assembly performance of the external expanding apparatus can be improved.

According to the external expanding apparatus with the aforementioned construction, moreover, the cover 182 for opening and closing the inlet slot 180 of each of the first and second card storage units 172a and 172b is composed of first and second cover members 182a and 182b which are divided in the thickness direction of the slot 180. In loading the card storage unit 172a or 172b with a relatively thin card-shaped electronic component, only the first cover member 182a is opened, and the second cover member 182b is kept in the closed position. Even in the case where the loaded electronic component is relatively thin, therefore, the inlet slot 180 can be kept in the closed state by the second cover member 182b and the rear end of the electronic component, so that dust, foreign matter, etc. can be securely prevented from getting into the apparatus through the slot 180.

In the case where the cover 182 is composed of the two cover members 182a and 182b, moreover, each individual cover member can be more compact than a cover which is formed of a single plate. Accordingly, these cover members require only a small storage space when in the closed position, thus making for the reduction of the overall size of the external expanding apparatus.

Figure 22:
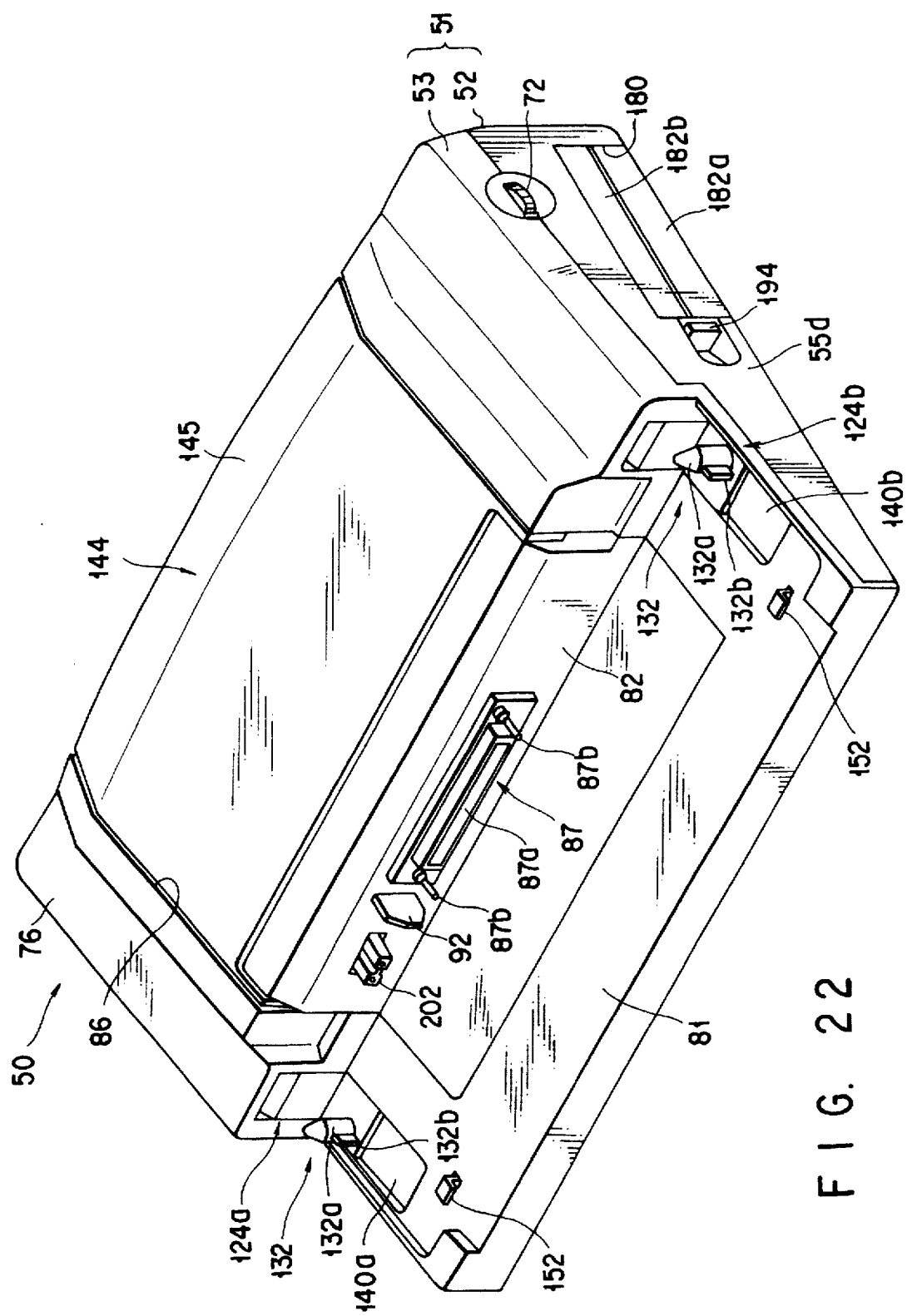
Figure 23:
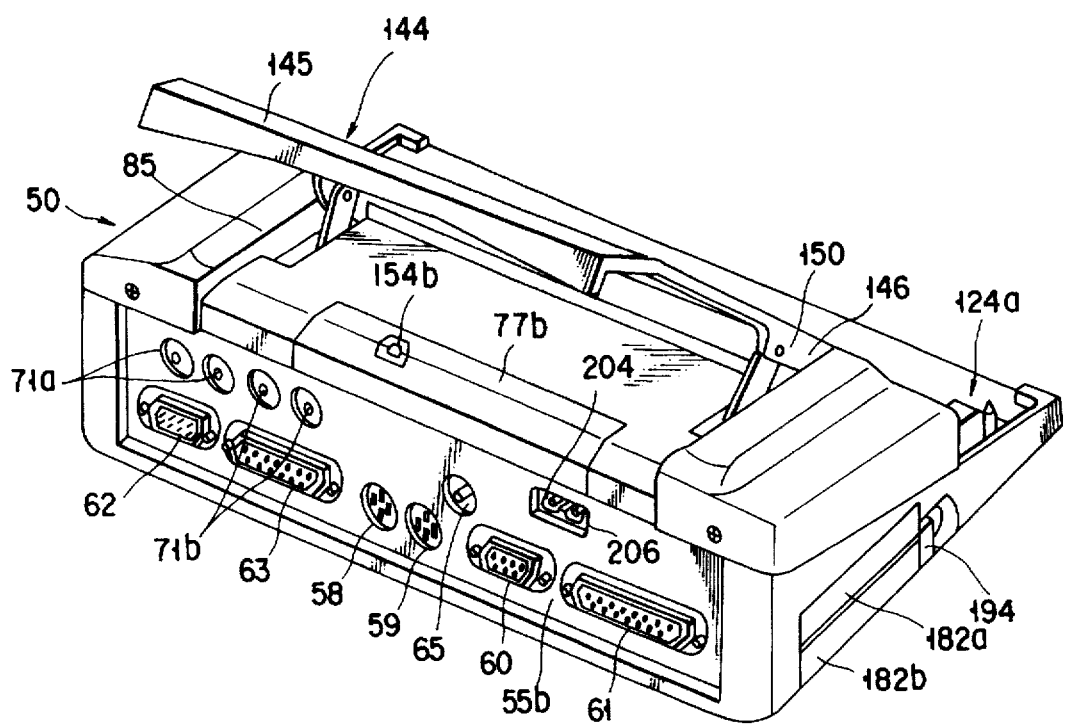
Figure 24:
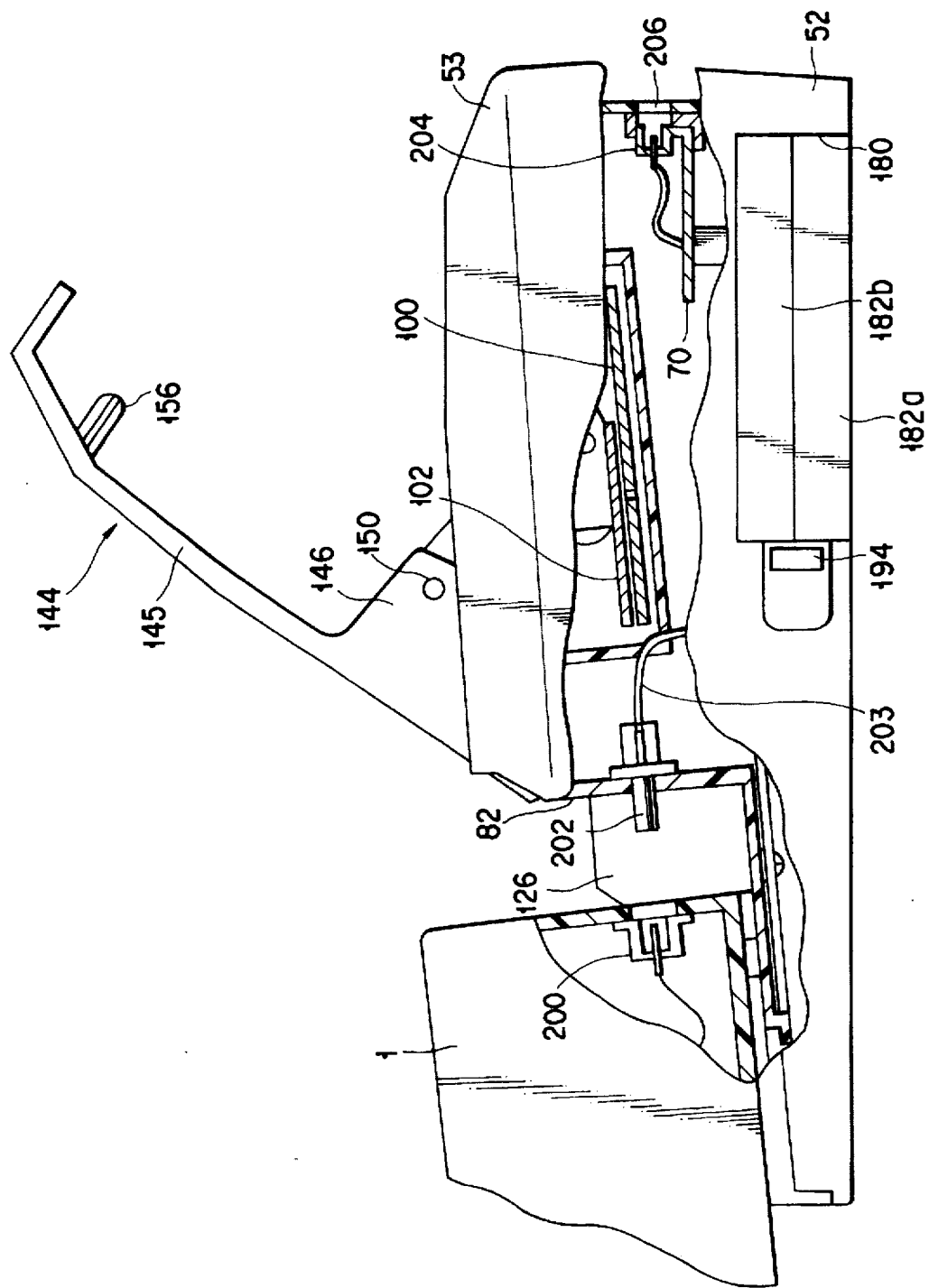

FIGS. 22 to 24 show an external expanding apparatus 50 according to a second embodiment of the present invention. This external expanding apparatus 50 differs from the one according to the first embodiment in that it is connectable with an AC-driven portable computer 1. Like reference numerals are used to designate the same portions as the first embodiment includes, and a description of those portions is omitted. The following is a detailed description of those portions which differentiate the second embodiment from the first embodiment.

Figure 25:
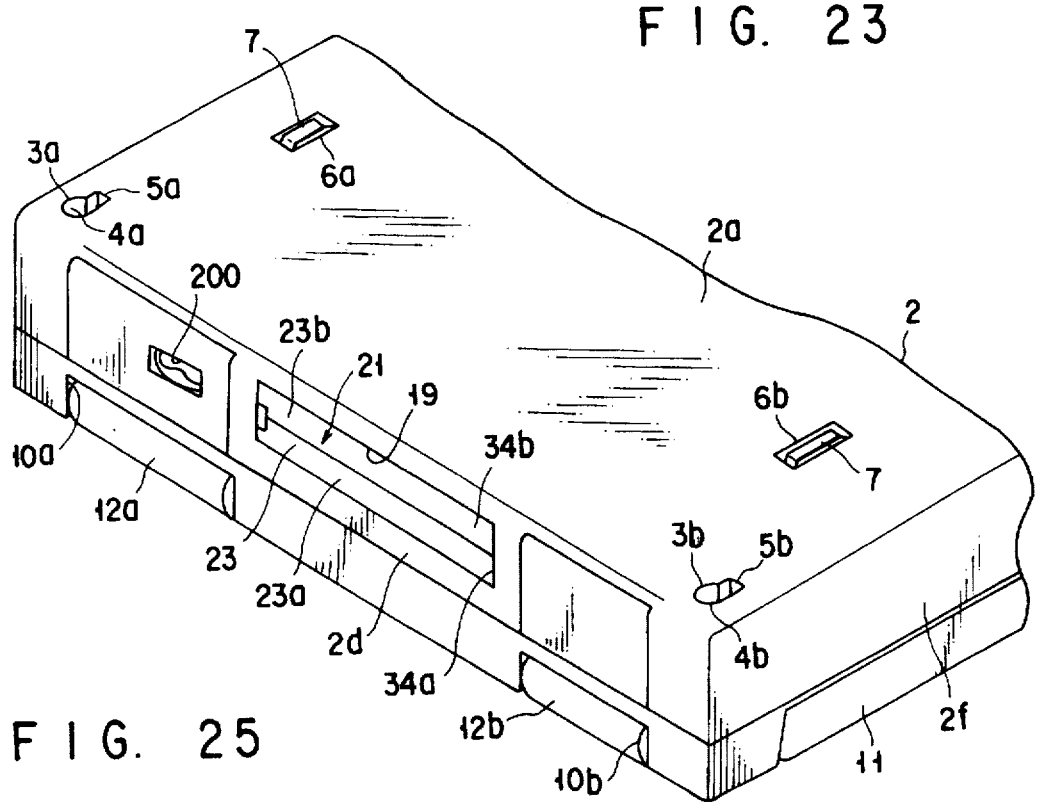
FIG. 25 is a perspective view showing the rear bottom side of a portable computer connected to the external expanding apparatus according to the second embodiment.

The AC-driven portable computer 1 will be explained first. As shown in FIG. 25, the computer 1 has an AC power supply socket 200 on its rear face 2d. A pair of fitting holes 3a and 3b formed in a bottom face 2a of the computer 1 are different in shape from those of the foregoing DC-driven personal computer 1.

The fitting hole 3a includes a cylindrical portion 4a and a groove portion 5a, while the fitting hole 3b includes a cylindrical portion 4b and a groove portion 5b. The groove portions 5a and 5b extend forward from their corresponding cylindrical portions 4a and 4b, with respect to a casing 2.

As shown in FIGS. 22 to 24, on the other hand, the external expanding apparatus 50 comprises an AC power supply plug 202 for use as an AC power supply connector, which is projectingly attached to a connector setting surface 82 of an upper housing 53. The plug 202 is located beside a cover operating member 92. The AC power supply plug 202 is connectable to the AC power supply socket 200 of the computer 1, and is connected to a main circuit board in a lower housing 52 by means of a lead wire 203.

An apparatus-side AC power supply socket 204 is mounted on a sub-circuit board 70 in the lower housing 52. The socket 204 is exposed on the rear side through an opening 206 in the rear face of the lower housing 52, and is connected electrically to the AC power supply plug 202 through the sub-circuit board 70, main circuit board, and lead wire 203.

Engaging projections 132 provided individually on a pair of hook units 12a and 124b, left and right, are modified in shape so as to match the fitting holes 3a and 3b of the computer 1. More specifically, each engaging projection 132 includes a cylindrical portion 132a and a flat plate portion 132b protruding forward from the cylindrical portion 132a, and is designed so as to be able to be fitted only in the fitting hole 3a or 3b of the AC-driven computer 1.

In connecting the computer 1 to the external expanding apparatus 50 constructed in this manner, an operating lever 144 is swung beforehand toward its release position so that the hook units 124a and 124b are moved to their second position. Then, the rear end portion of the computer 1 is put on a bearing surface 81 and the hook units 124a and 124b in a manner such that the respective engaging projections 132 of the hook units 124a and 124b are fitted in their corresponding fitting holes 3a and 3b in the bottom face 2a of the computer 1.

Subsequently, the operating lever 144 is swung down toward its home position, and the hook units 124a and 124b are slid toward their first position. Thereupon, the computer 1, along with the hook units 124a and 124b, is moved toward the connector setting surface 82.

When the hook units 124a and 124b are moved together with the computer 1 to the first position, a first expansion connector 14 of the computer 1 is joined to a second expansion connector 87 of the external expanding apparatus 50. Thus, the computer 1 and the external expanding apparatus 50 are connected electrically to each other by means of the first and second expansion connectors 14 and 87. At the same time, the AC power supply plug 202 of the expanding apparatus 50 is fitted into the AC power supply socket 200 of the computer 1. As a result, the socket 200 is connected electrically to the AC power supply socket 204 of the external expanding apparatus 50 through the AC power supply plug 202, lead wire 203, main circuit board, and sub-circuit board 70.

Thus, AC current can be supplied to the computer 1 through the external expanding apparatus 50 by fitting an AC feeder plug (not shown) for as an AC feeder connector into the AC power supply socket 204.

In removing the computer 1 from the external expanding apparatus 50, the operating lever 144 is swung up from the home position to the release position, whereby the hook units 124a and 124b, along with the computer 1, are pushed out to the second position. As a result, the first and second expansion connectors 14 and 87 are disconnected from each other, while the AC power supply socket 200 and the AC power supply plug 202 are disengaged from each other. Thereupon, the computer 1 is ready to be removed.

Constructed in this manner, the external expanding apparatus according to the second embodiment can produce the same effects of the first embodiment. Since the apparatus of the second embodiment is provided with the AC power supply plug 202 and the AC power supply socket 204, moreover, it can be connected with the AC-driven portable computer 1 to extend the function of the computer 1.

The respective engaging projections 132 of the hook units 124a and 124b, as engaging portions, are shaped after the fitting holes 3a and 3b in the AC-driven computer 1, and can engage the holes 3a and 3b only. If connection of a computer of any different type, e.g., the aforementioned DC-driven computer, to the external expanding apparatus 50 is tried, therefore, the engaging projections 132 cannot be fitted in fitting holes of this computer. Accordingly, non-conforming computers can be prevented from being erroneously connected to the external expanding apparatus.

Thus, damaging the first and second expansion connectors, AC power supply plug 202, etc., which may occur when a nonconforming computer is connected by mistake, can be prevented securely.

According to the second embodiment, it is necessary only that the shapes of the fitting holes of the computer and the engaging projections of the external expanding apparatus be different from those of fitting holes of computers of different types, such as DC-driven computers, and engaging projections of external expanding apparatuses of different types. Thus, each engaging projection is not limited to the combination of the cylindrical portion and the flat plate portion, and may be in various other shapes.

According to the present invention, as described in detail herein, there may be provided a high-safety external expanding apparatus in which a warning signal is delivered to an electronic device when disconnecting operation by means of an operating member is started after the movement of the operating member is detected, so that the electronic device can be prevented from being unexpectedly disengaged form the apparatus.

According to the invention, moreover, there may be provided an external expanding apparatus which is provided with an AC power supply connector connectable with an AC power supply socket of an electronic device and an apparatus-side AC power supply socket connected to the AC power supply connector, whereby the function of the AC-driven electronic device can be extended.

According to the invention, furthermore, there may be provided an external expanding apparatus in which the shape of engaging portions is modified to match the type of the electronic device, whereby an electronic device of a different type can be prevented from being erroneously connected to the apparatus.

According to the invention, moreover, there may be provided an external expanding apparatus in which a cover for opening and closing an inlet slot of each card storage unit is composed of first and second cover members, so that the card storage unit can be loaded with various types of card-shaped electronic components, dust, foreign matter, etc. can be prevented from getting into the apparatus through the inlet slot, and the apparatus can be successfully reduced in size.

According to the invention, furthermore, there may be provided an external expanding apparatus in which the distance between second junction connectors is made wider than that between first junction connectors, so that the assembly performance of the apparatus is outstanding.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An external expanding apparatus for expanding the function of a portable electronic device having a device body provided with a first connector, said apparatus comprising:

an apparatus body having a bearing surface on which the device body is to be placed, and a connector setting surface for opposing the first connector when the device body placed on the bearing surface;

a second connector mounted on the connector setting surface and connectable with the first connector;

an engaging portion provided at the bearing surface and movable between a first position in which the engaging portion adjoins the connector setting surface and a second position in which the engaging portion is separated from the connector setting surface, for engaging the device body on the bearing surface;

operating means connected to the engaging portion and including an operating member provided on the apparatus body so as to be movable between a home position, a release position, and a connection completion position between the home and release positions, for moving the engaging portion from the second position to the first position, thereby causing the first connector to engage the second connector as the operating member is moved from the release position to the connection completion position, and for moving the engaging portion from the first position to the second position, thereby causing the first and second connectors to be disconnected from each other as the operating member is moved from the connection completion position to the release position;

sensing means for detecting the movement of the operating member between the home position and the release position; and output means for delivering a warning signal to the portable electronic device through the first and second connectors when the movement of the operating member from the home position to the connection completion position is detected by the sensing means.

2. An external expanding apparatus according to claim 1, wherein said sensing means includes a sensed portion which is movable between a nonoperating position and an operating position and is adapted to be moved to the operating position by movement of the operating member to the home position, and a sensor portion for detecting movement of the sensed portion to the operating position.

3. An external expanding apparatus according to claim 1, wherein said apparatus body has a top face continuous with the connector setting surface, and said operating member is swingably mounted on the apparatus body so as to adjoin the top face in substantially parallel relation when in the home position and to face the top face at an angle thereto when in the release position.

4. An external expanding apparatus according to claim 3, wherein said sensing means includes an actuating piece having an abutting portion exposed on the top face of the apparatus body and movable between a nonoperating position and an operating position, a push member provided on the operating member for pushing the abutting portion of the actuating piece to move the actuating piece to the operating position when the operating member is moved to the home position, and a sensor for detecting movement of the actuating piece to the operating position.

5. An external expanding apparatus according to claim 3, wherein said operating means includes a slide member connected to the engaging portion and movable in a direction parallel to the bearing surface, and a link mechanism connecting the slide member and the operating member for converting the swinging motion of the operating member into a linear motion and transmitting the linear motion to the slide member.

6. An external expanding apparatus according to claim 1, which further comprises a plurality of branch connectors attached to the apparatus body, connected electrically to the second connector, and connectable individually with other electronic devices.

7. An external expanding apparatus according to claim 6, which further comprises a circuit board located in the apparatus body and provided with the branch connectors, a plurality of first junction connectors arranged at predetermined intervals on the circuit board, a flexible wiring board extending from the second connector, and a plurality of second junction connectors arranged at intervals wider than the predetermined intervals on an extending end portion of the flexible wiring board, and connected individually to the first junction connectors so as to connect the branch connectors electrically to the first connector through the circuit board and the flexible wiring board.

8. An external expanding apparatus for expanding the function of a specific portable electronic device having a device body provided with an engagement portion in a predetermined shape and a first connector, comprising:

an apparatus body having a bearing surface on which the device body is to be placed, and a connector setting surface for opposing the first connector when the device body is placed on the bearing surface;

a second connector mounted on the connector setting surface and connectable with the first connector;

an engaging portion provided at the bearing surface and movable between a first position in which the engaging portion adjoins the connector setting surface and a second position in which the engaging portion is separated from the connector setting surface, the engaging portion having a shape corresponding to the shape of the engagement portion of the device body so as to engage only the engagement portion; and operating means connected to the engaging portion and including an operating member provided on the apparatus body so as to be movable between a release position and a connection completion position, for moving the engaging portion from the second position to the first position, thereby causing the first connector to engage the second connector as the operating member is moved from the release position to the connection completion position, and for moving the engaging portion from the first position to the second position, thereby causing the first and second connectors to be disconnected from each other as the operating member is moved from the connection completion position to the release position.

9. An external expanding apparatus according to claim 8, wherein said engagement portion of the device body includes a recess having a predetermined shape, and said engaging portion includes a projection having a shape corresponding to the recess and adapted to be received in the recess.

10. An external expanding apparatus according to claim 9, wherein said device body has a rear wall fitted with the first connector and a bottom wall having the engagement portion and facing the bearing surface, and said engaging portion includes a base portion, facing the bottom wall of the apparatus body and including the projection, and an abutting portion for abutting the rear wall of the apparatus body.

* * * * *